US010266284B2

(12) United States Patent
Coffey et al.

(10) Patent No.: US 10,266,284 B2
(45) Date of Patent: Apr. 23, 2019

(54) SEPARATION SYSTEM AND BURN WIRE RELEASE MECHANISM FOR TETHERED SPACECRAFT

(71) Applicants: Shannon Coffey, Springfield, VA (US); Joseph A. Carroll, Chula Vista, CA (US); Paul Oppenheimer, Edgewater, MD (US); Jordan R. Schlater, Rossburg, OH (US); Ivan Galysh, Chantilly, VA (US); Eugene Levin, Minnetonka, MN (US); Curt Hogan, Napoleon, OH (US); Adam Thurn, Washington, DC (US)

(72) Inventors: Shannon Coffey, Springfield, VA (US); Joseph A. Carroll, Chula Vista, CA (US); Paul Oppenheimer, Edgewater, MD (US); Jordan R. Schlater, Rossburg, OH (US); Ivan Galysh, Chantilly, VA (US); Eugene Levin, Minnetonka, MN (US); Curt Hogan, Napoleon, OH (US); Adam Thurn, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 973 days.

(21) Appl. No.: 14/229,905

(22) Filed: Mar. 29, 2014

(65) Prior Publication Data
US 2015/0115106 A1    Apr. 30, 2015

Related U.S. Application Data

(63) Continuation of application No. PCT/US2012/057947, filed on Sep. 28, 2012.

(60) Provisional application No. 61/540,674, filed on Sep. 29, 2011.

(51) Int. Cl.
*B64G 1/64* (2006.01)
*B26F 3/12* (2006.01)
(Continued)

(52) U.S. Cl.
CPC ............. *B64G 1/648* (2013.01); *B26F 3/12* (2013.01); *B64G 1/40* (2013.01); *B64G 1/645* (2013.01);
(Continued)

(58) Field of Classification Search
CPC ........ B64G 1/222; B64G 1/645; B64G 1/648; B64G 2001/224; B26F 3/12
See application file for complete search history.

(56) References Cited

U.S. PATENT DOCUMENTS 3,532,298 A * 10/1970 Swet ..................... B64G 1/007
                                                              244/167
3,715,092 A *  2/1973 Moyer .................. B64G 1/645
                                                              244/167
(Continued)

OTHER PUBLICATIONS

International Preliminary Report on Patentability in PCT/US2012/057947, dated Apr. 10, 2014, 7 pages.
(Continued)

*Primary Examiner* — Joseph W Sanderson
(74) *Attorney, Agent, or Firm* — US Naval Research Laboratory; Richard F. Bis

(57) ABSTRACT

A tethered spacecraft has a first endmass and a second endmass with a telescoping stacer spring and a tether arranged between the endmasses. The spring is coiled around a center rod and initially contained within a housing, the spring being biased to push the first endmass away from the second endmass. The spring housing is affixed to the first endmass, a first end of the spring being affixed to the spring housing, and tether are affixed to spring at one end and to the second endmass at the other end. A pretensioned loop holds
(Continued)

the endmasses abuttingly together, and a burnwire release mechanism cuts the loop to deploy the spring. Upon deployment, the spring extends to its full length to form a cylindrical boom, and the endmasses continue to move outward along the spring centerline until stopped by the tether.

15 Claims, 29 Drawing Sheets

(51) Int. Cl.
  *B64G 1/40* (2006.01)
  *B64G 1/10* (2006.01)
  *B64G 1/36* (2006.01)
  *B64G 1/44* (2006.01)
  *B64G 1/66* (2006.01)

(52) U.S. Cl.
  CPC .............. *B64G 1/1021* (2013.01); *B64G 1/36* (2013.01); *B64G 1/363* (2013.01); *B64G 1/366* (2013.01); *B64G 1/44* (2013.01); *B64G 1/66* (2013.01); *Y10T 83/293* (2015.04)

(56) References Cited

U.S. PATENT DOCUMENTS

| | | | |
|---|---|---|---|
| 3,735,942 A * | 5/1973 | Palz | B64G 1/222 136/245 |
| 5,082,211 A * | 1/1992 | Werka | B64G 1/242 244/158.2 |
| 6,439,122 B1 | 8/2002 | Nygren et al. | |
| 6,597,631 B2 | 7/2003 | Kitchin et al. | |
| 7,178,763 B2 | 2/2007 | Licata | |
| 2002/0100642 A1 | 8/2002 | Mehrman et al. | |
| 2010/0257983 A1* | 10/2010 | Jordan | B26D 1/08 83/13 |
| 2015/0102172 A1* | 4/2015 | Thurn | B64G 1/40 244/158.2 |

OTHER PUBLICATIONS

Ullrich, R., et al., "The Stereo IMPACT Boom", Space Sci. Rev., vol. 136, pp. 185-201, Apr. 2008.
Surrey Satellite Technology Ltd., "SSTL-Weitzmann 6m Deployable Boom", 2 pages, [online], [retrieved on Jan. 1, 2010], <microsat.sm.bmstu.ru/e-library/SSTL/Boom_HQ.pdf>.
Auslander, D., et al., "Instrument Boom Mechanisms on the THEMIS Satellites; Magnetometer, Radial Wire, and Axial Booms", Space Sci Rev, vol. 141, pp. 185-211, Dec. 2008.
McKinney, D., "NRL's TEPCE Spacecraft Undergoes Successful Deployment Test", May 19, 2010, [online], [retrieved on Feb. 23, 2011], <<URL: http://www.nrl.navy.mil/media/news-releases/2010/nrls-tepce-spacecraft-undergoes-successful-deployment-test>.
Cosmo, M.L.; Lorenzi, E.C.; "Tethers in Space Handbook", Dec. 1997, 244 pages.

* cited by examiner

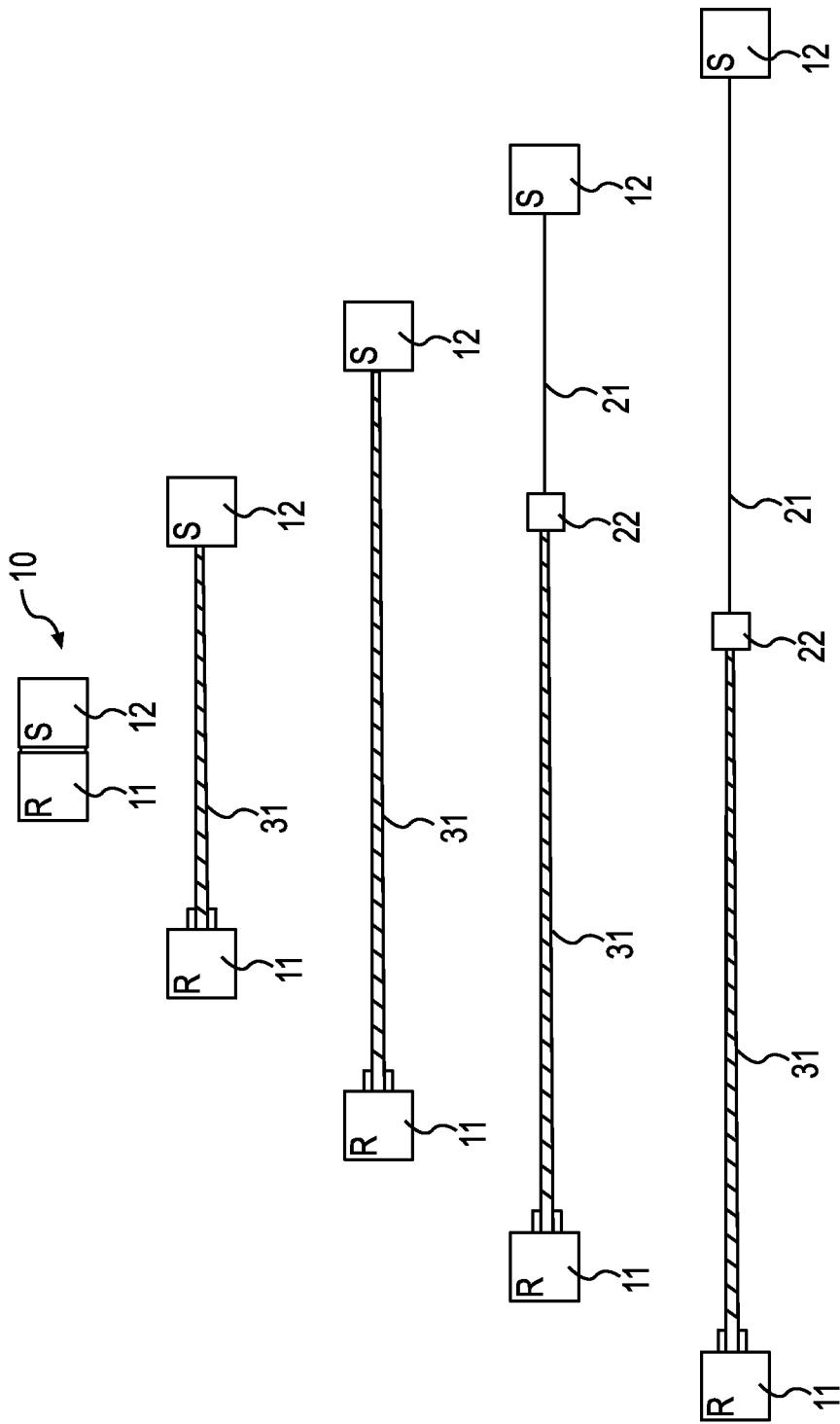

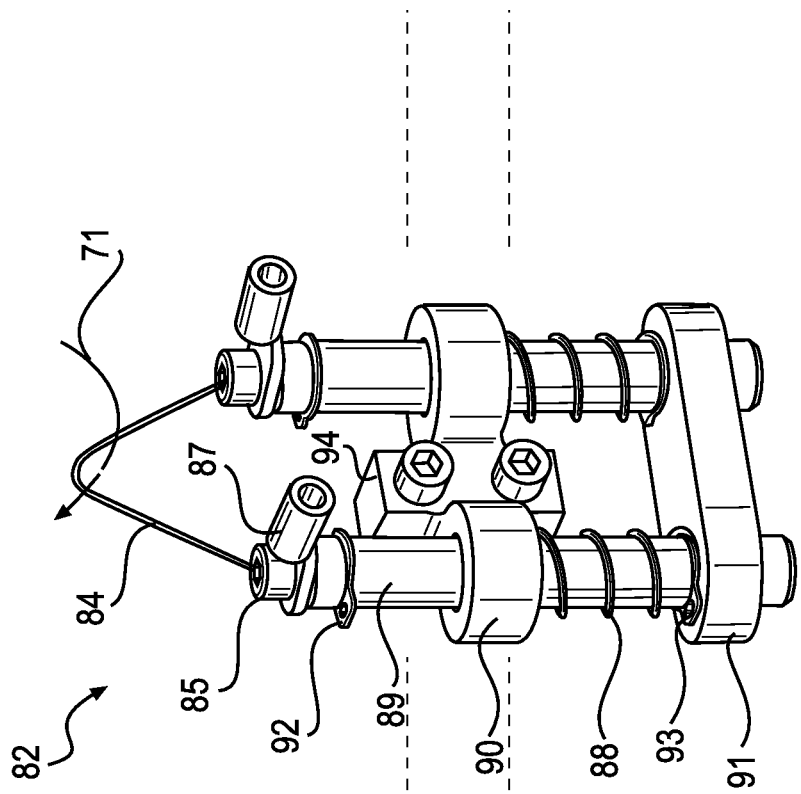
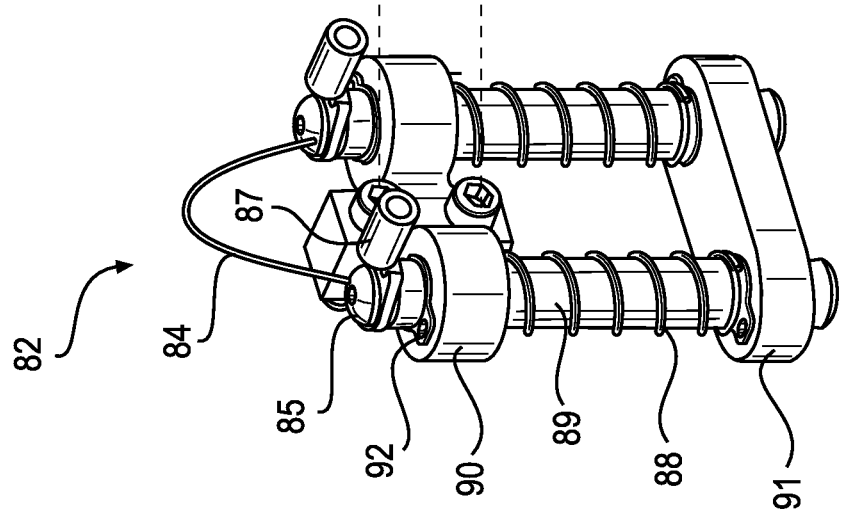
FIG. 10B
FIG. 10A

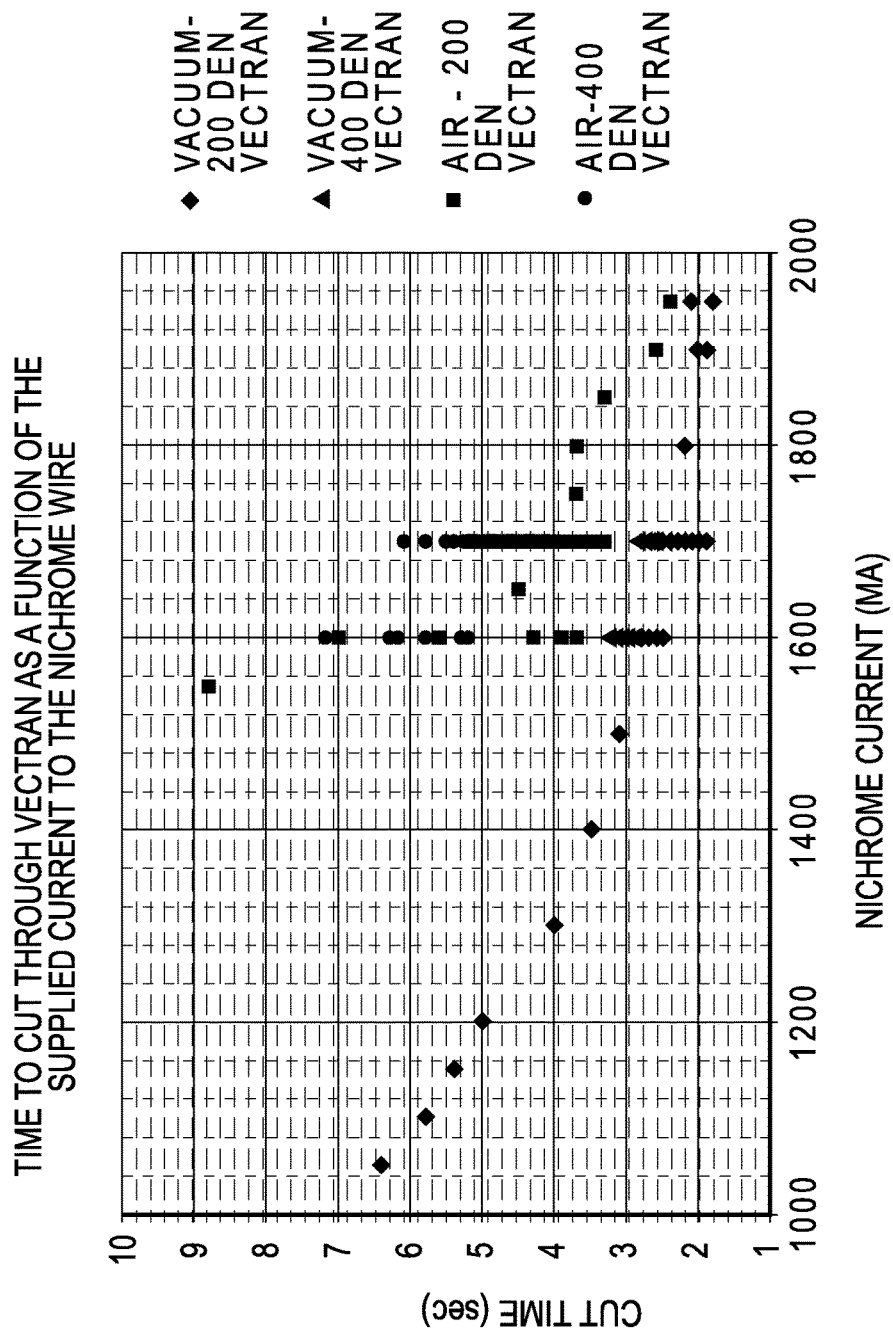

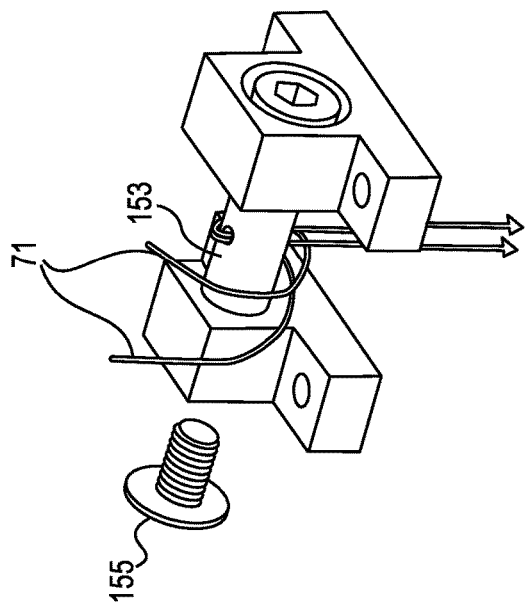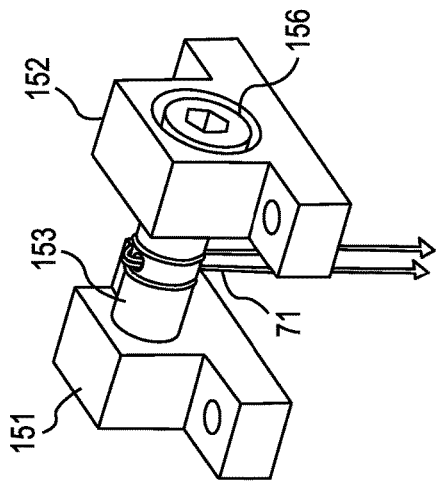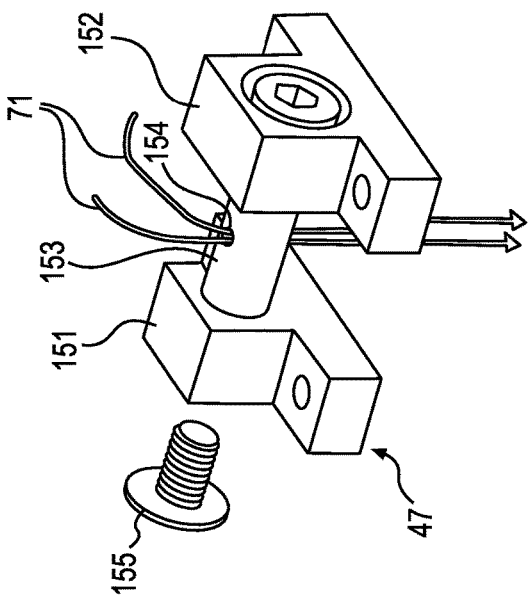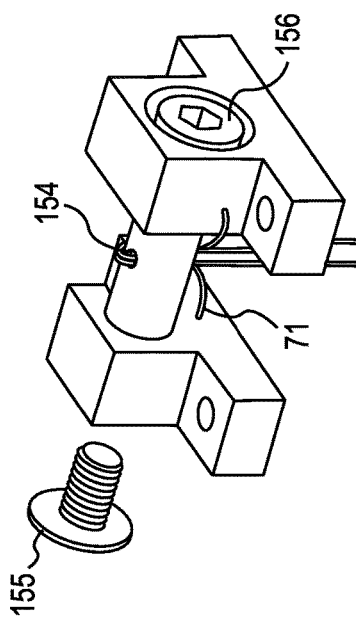

SEPARATION SYSTEM AND BURN WIRE RELEASE MECHANISM FOR TETHERED SPACECRAFT

CROSS REFERENCE TO RELATED APPLICATIONS

This is a continuation under 35 USC 111 and 35 USC 365 of PCT/US12/57947 filed on Sep. 28, 2012, which claims the priority of provisional application 61/540,674 filed on Sep. 29, 2011, the entire disclosures of which are incorporated herein by reference.

BACKGROUND

1. Technical Field

This is related to spacecraft, and in particular, to tethered spacecraft.

2. Background Technology

Tethered spacecraft have been developed that include two end bodies and a tether between the end bodies. The spacecraft must have the ability to separate the two end bodies in space.

The Tether Physics and Survivability Satellite (TIPs) was developed by the Naval Research Laboratory, and launched in 1996. The TIPs free flying satellite had two end bodies connected by a four kilometer non-conducting tether, as described in M. L. Cosmo and E. C. Lorini in NASA, Tethers in Space Handbook, third edition, December 1997. The TIPS satellite had a separation mechanism that included a group of springs placed in a circle with a diameter of approximately twelve inches, in the center of the two end bodies. The end bodies were sufficiently massive to allow the use of matching multiple springs to provide the separation energy. However, for smaller end bodies with small masses, any mismatch in the springs can result in large tipoff rates, which can cause the tether to not deploy completely.

R. Ullrich et al., "The STEREO IMPACT Boom", Space Science Review, Vol. 136, pp. 185-201, 2008 discloses a spacecraft boom formed of telescoping concentric tubes that are pushed outward by a stacer and form a rigid platform for supporting imaging instruments. Another stacer-based system is described in D. Auslander et al., "Instrument Boom Mechanisms on the THEMIS Satellites; Magnetometer, Radial Wire, and Axial Booms", Space Science Review, vol. 141, pp. 185-211, 2008.

U.S. Pat. No. 6,597,631 to Kitchin et al. discloses a deployment mechanism that includes a stacer for deploying sensors. U.S. Pat. No. 7,178,763 to Licata discloses a passive deployment mechanism for space tethers that includes a tether wound upon a spool and a spring separation mechanism.

BRIEF SUMMARY

A tethered spacecraft includes a first endmass and a second endmass with a telescoping stacer spring and a tether arranged between the endmasses. The spring is coiled around a center rod and initially contained within a housing, the spring being biased to push the first endmass away from the second endmass. The spring housing is affixed to the first endmass, a first end of the spring being affixed to the spring housing, and tether are affixed to spring at one end and to the second endmass at the other end. A pretensioned loop holds the endmasses abuttingly together, and a burnwire release mechanism cuts the loop to deploy the spring. Upon deployment, the spring extends to its full length to form a cylindrical boom, and the endmasses continue to move outward along the spring centerline until stopped by the tether.

BRIEF DESCRIPTION OF THE DRAWINGS

FIG. 1 illustrates deployment of an exemplary tethered spacecraft from an initial closed position to its final deployed position.

FIGS. 10A and 10B show the burn wire release mechanism being positioned with the burn wire in contact with the closure loop.

FIG. 11 shows test results for time to burn through the restraint material as a function of current through the burn wire for several types of restraint material, in both air and vacuum.

FIG. 13A-13D shows steps in the tensioning process.

DETAILED DESCRIPTION OF EMBODIMENTS OF THE INVENTION

Figure 2A:
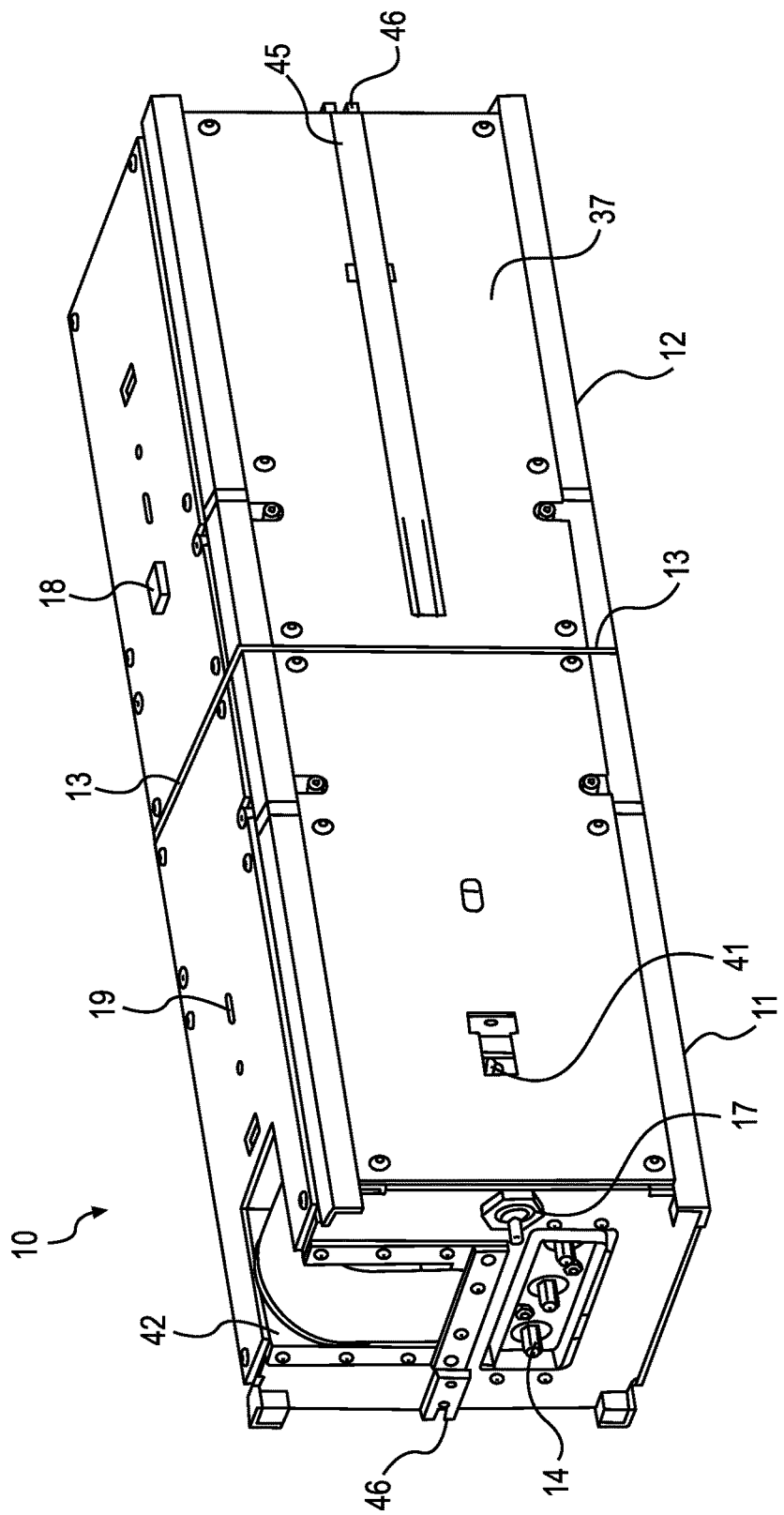
FIG. 2A illustrates an exemplary spacecraft.

The spacecraft according to an embodiment of the invention is a tethered spacecraft with two endmasses joined by a tether when deployed. A tightly coiled telescoping spring, called a stacer, is the primary device used to separate the endmasses. A tether is connected to a bulkhead terminal on one of the end masses and to the tether spool located at the end of the stacer on the opposite endmass.

Two small endmasses that form a satellite or spacecraft are initially held together in a unit for initial deployment, with a tightly coiled stacer between them. The stacer is a single telescoping spring device that is held in the retracted position for the launch. The stacer is mounted along the centerline of a tethered spacecraft to provide the force to separate the endmasses with minimal rotational tipoffs on the two endmasses. Once launched into orbit, the stacer is released, pushing the satellites apart, and the endmasses continue to separate until the tether between them is taut. The separation mechanism is small enough to be carried on small satellites, such as on cubesats, but is also applicable to larger satellites. The spool of tether is mounted to the end of the stacer to provide realigning force to minimize stoppage of the unwinding of the tether until it is fully deployed. The term STACER refers to a "spiral tube and actuator for controlled extension and retraction", developed initially by AMETEK Hunter Spring, located in Feastersville, Pa., USA, which is a division of AMETEK, Inc. When deployed, the cylindrical coiled spring metal STACER extends rapidly under its own power into a full length, self-supporting tube. When released, the stacer metal extends longitudinally around its central axis, making a longer cylinder, which, when it reaches its full extension, forms a stiff cylindrical boom.

FIG. 1 shows the spacecraft 10 during the deployment sequence. Before separation, the exemplary spacecraft's two end masses 11 and 12 are held together. When activated, a release mechanism allows the endmasses to be pushed apart by the stacer 31 as the stacer extends to its full length.

The ends of the stacer 31 push against the surfaces of the two end masses 11 and 12 causing them to separate from each other. Within a second the stacer 31 extends to its full length of approximately 2 meters. After full extension of the stacer the separating endmasses continue to move apart along the stacer and tether axis, causing the tether 21 to unreel from the tether spool 22.

Note that FIG. 1 is not to scale. The stacer spring can be in the range of a few feet or tens of feet in length, while the tether can be in the range of one or more kilometers in length.

Figure 2B:
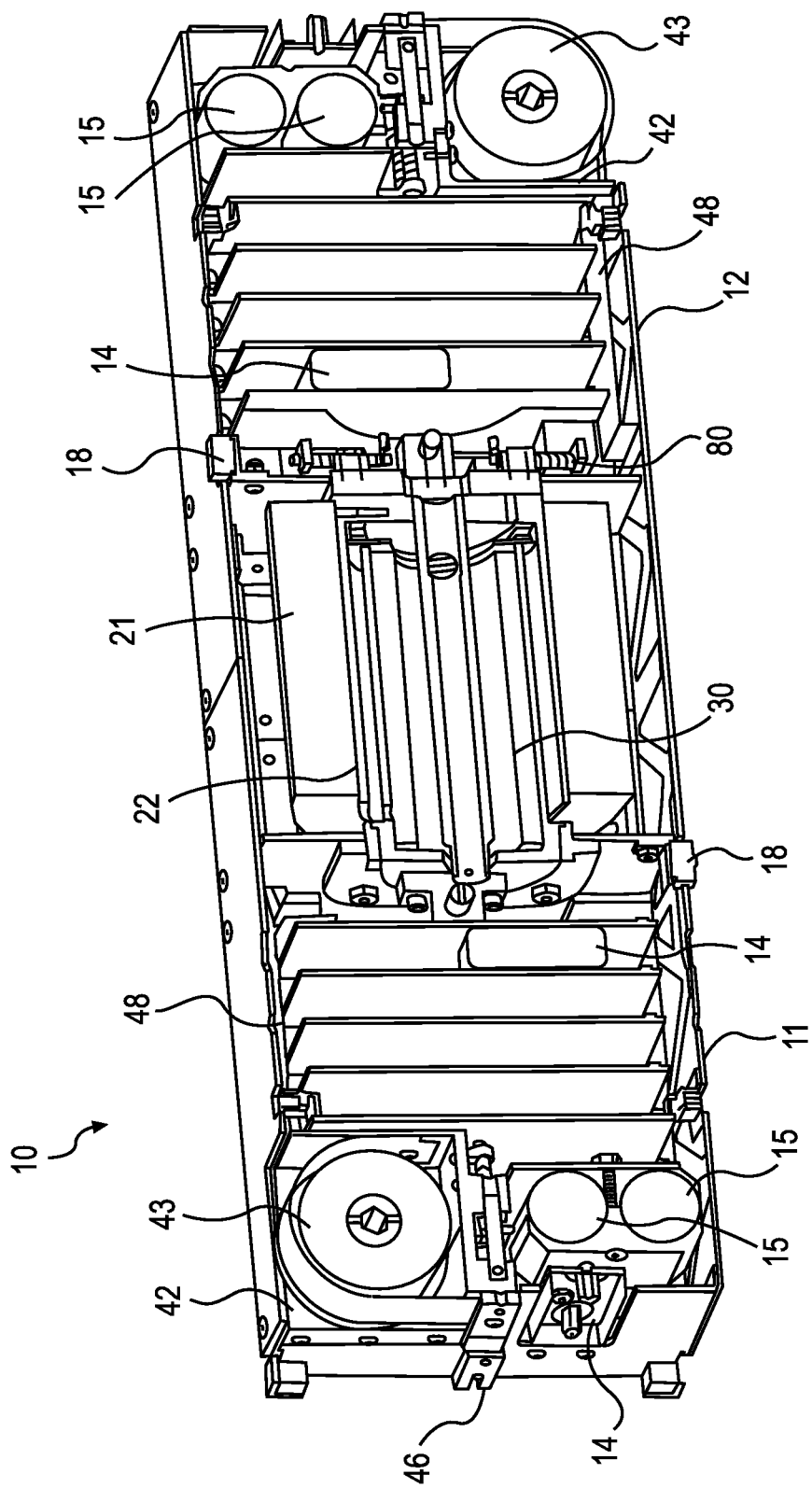
FIG. 2B illustrates a cut-away view of the spacecraft with the endmasses joined together in their stowed configuration.

FIG. 2A illustrates an exemplary spacecraft 10 having two end masses 11 and 12. FIG. 2B illustrates a cut-away view of the spacecraft 10 with the endmasses joined together in their stowed configuration. The spacecraft endmasses 11 and 12 have outer surfaces that abut each other along the separation plane 13.

Each of the two endmasses can include components including a GPS receiver 18, a battery power sources 15, 16, a collector system including a collector tape 43 and a collector housing 42, magnetic coils 48, an emitter 14, a sun sensor cutout 19, an impedance probe 45 with an impedance probe mount 46, communications antennas 61 and 62, an arming switch 41, and a separation switch 17. As will be shown in later figures, each endmass can also include one or more cameras or other imaging devices.

In an exemplary embodiment, the spacecraft 10 in its undeployed configuration has an overall length of about 13.4 inches, a width of about 4 inches, and a depth of about 4 inches. Thus, the spacecraft is approximately the size of a "3 U cubesat"; with a 1 U (or 1 unit) cubesat defined as a cube approximately 10 centimeters on each side, a 3 U or 3 unit cubesat would be defined as a "cube" with approximate dimensions of 10×10×30 cm. The endmasses are lightweight, each being in the range of a few pounds.

Each endmass 11, 12 can also include outer solar panels on one or more faces of the endmasses, with the solar panels forming the outer surface of the endmasses on each of four faces of an endmass. One solar panel is indicated as element 37 in FIG. 2A. The solar panels can include cut-outs or be arranged in a pattern to allow for components such as the impedance probe, collector, sun sensor, arming and separation switches, antennae, and other components.

The stacer and tether assemblies fit within a center portion of the spacecraft, between bulkheads 110 and 120. In this example, the stacer and tether assemblies extend beyond the end of the outer panels of the R endmass 11 into a cavity in the S endmass 12.

Figure 3A:
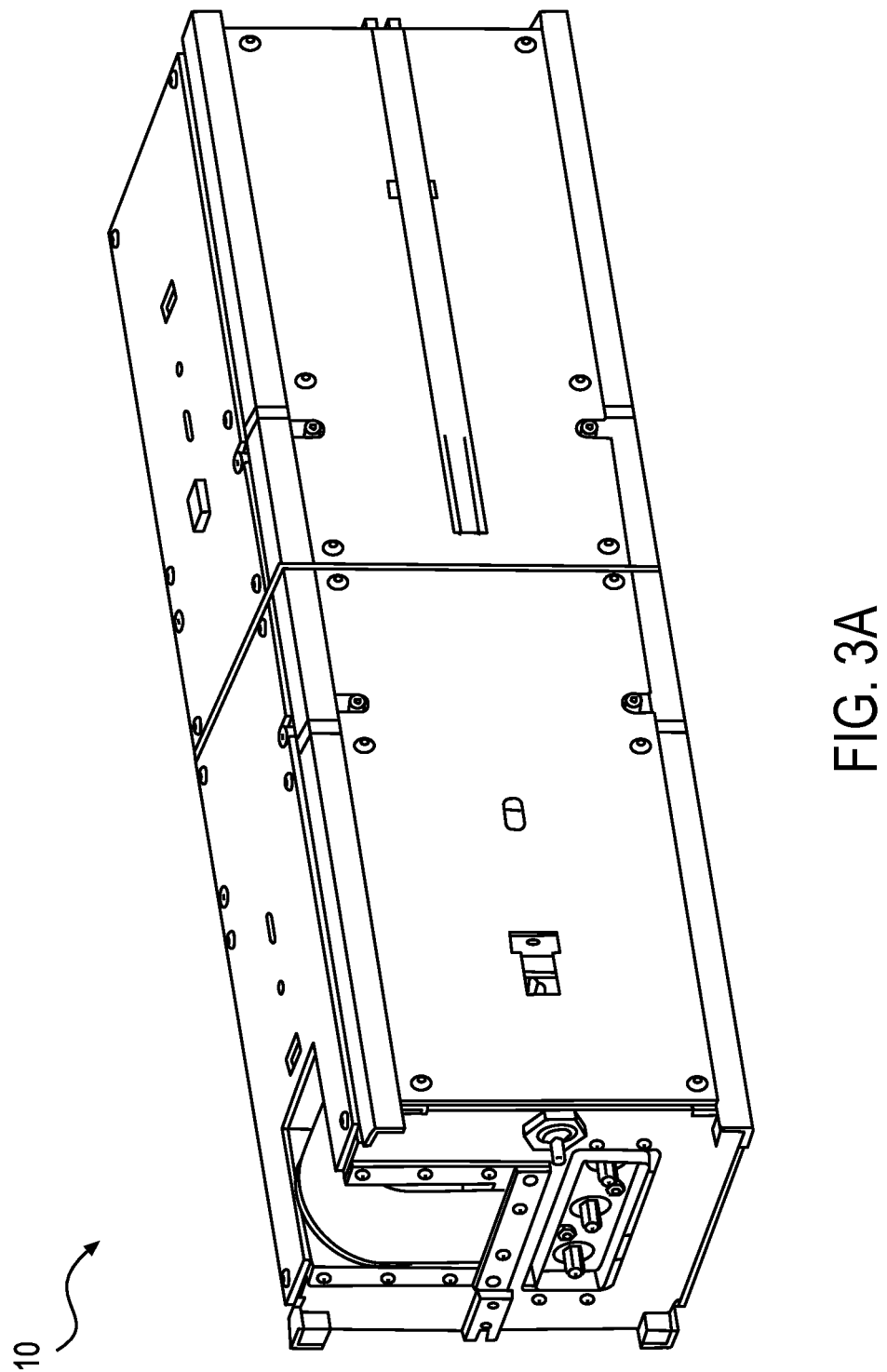
FIG. 3A-3G illustrates the deployment sequence of the spacecraft.
Figure 3B:
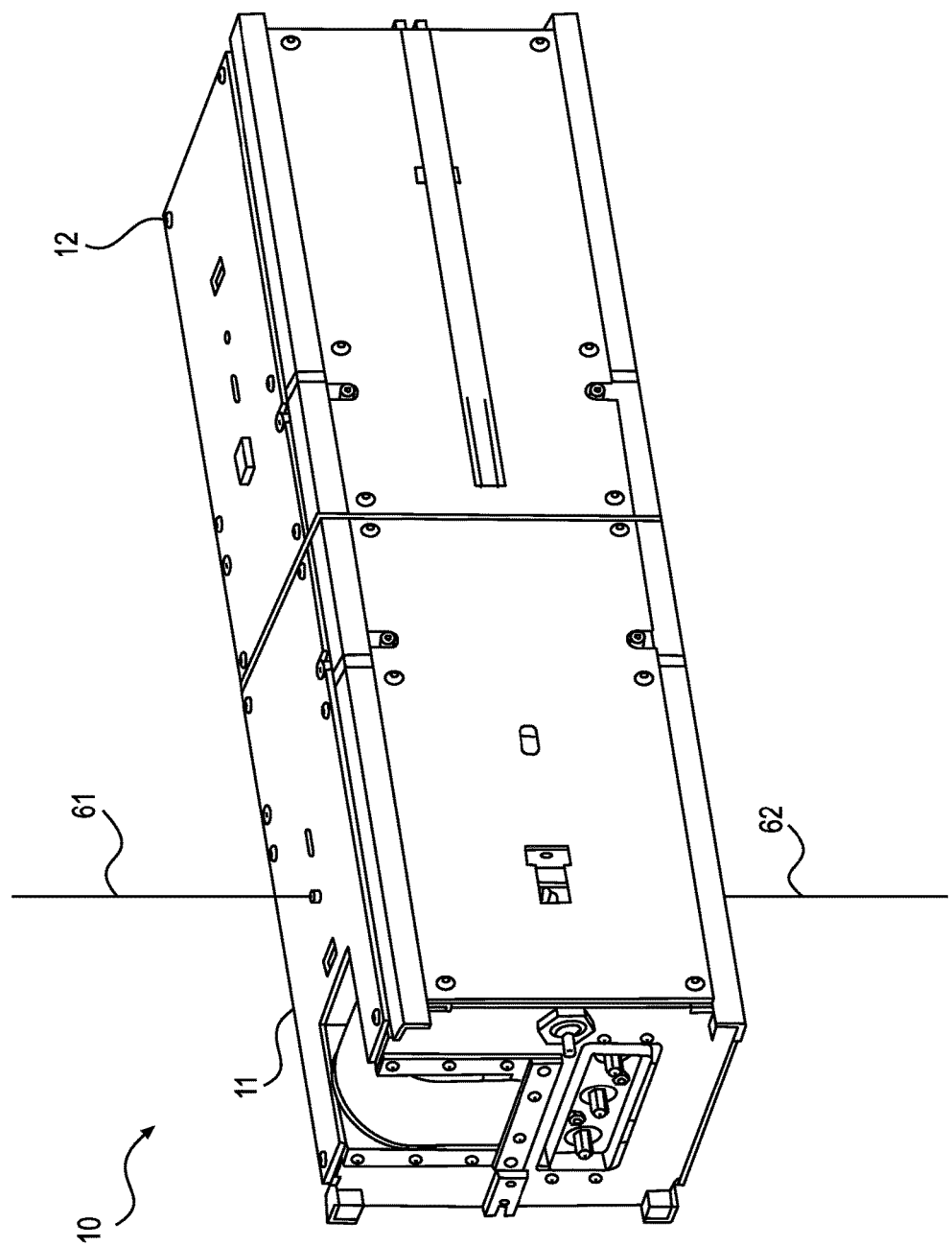

FIG. 3A-3F illustrate the deployment sequence in more detail. FIG. 3A shows the spacecraft 10 in its initial stowed mode. As shown in FIG. 3B, the communications antennas 61, 62 on R endmass 11 are deployed in accordance with a timer. Next, a release mechanism is activated to release the stacer 31. The endmasses 11 and 12 are designated herein as R and S for convenience.

Figure 3C:
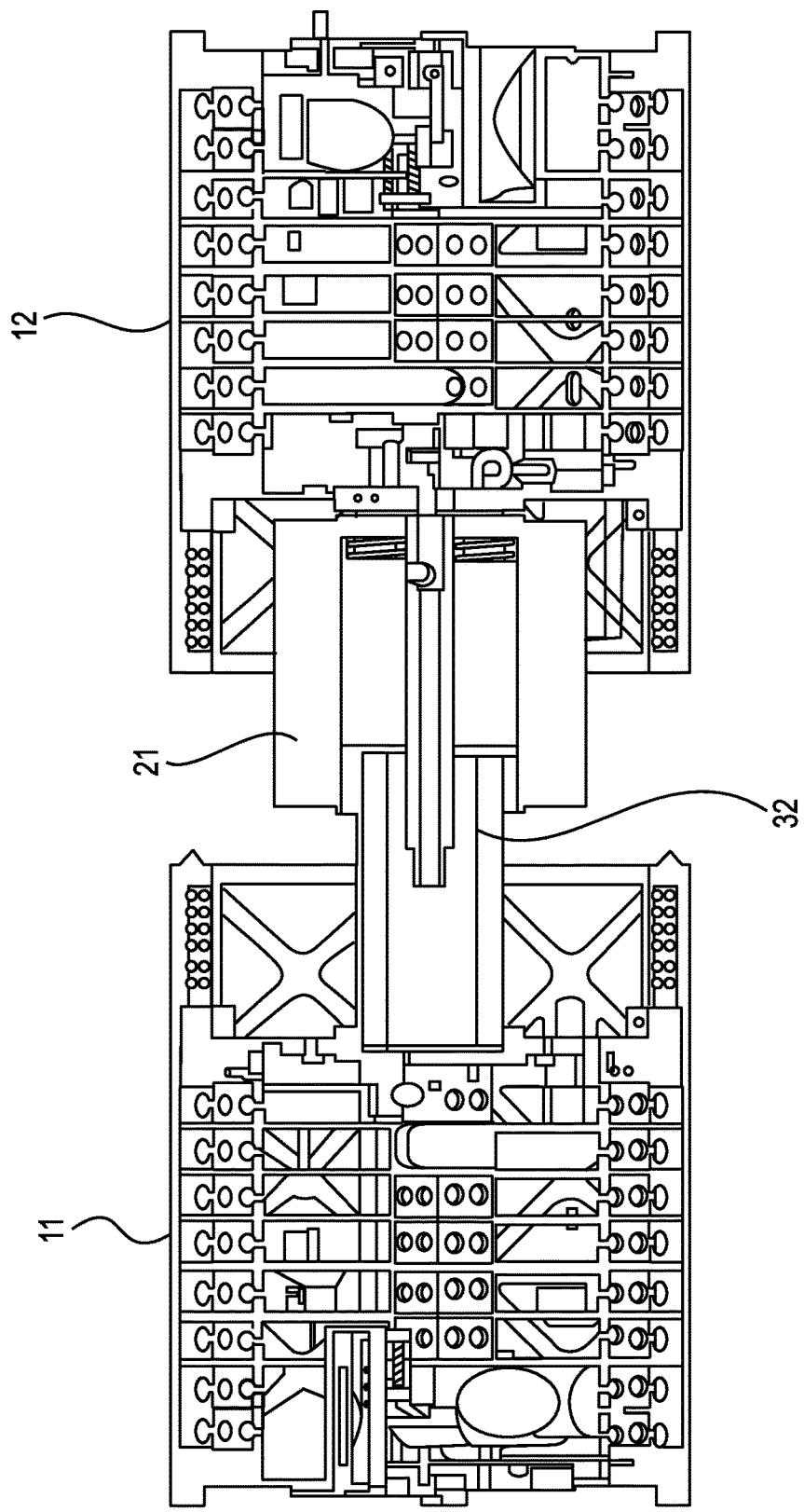
Figure 3D:
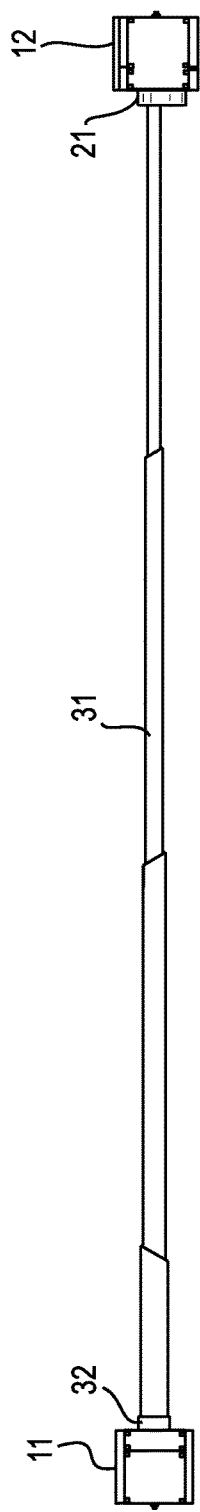
Figure 3E:
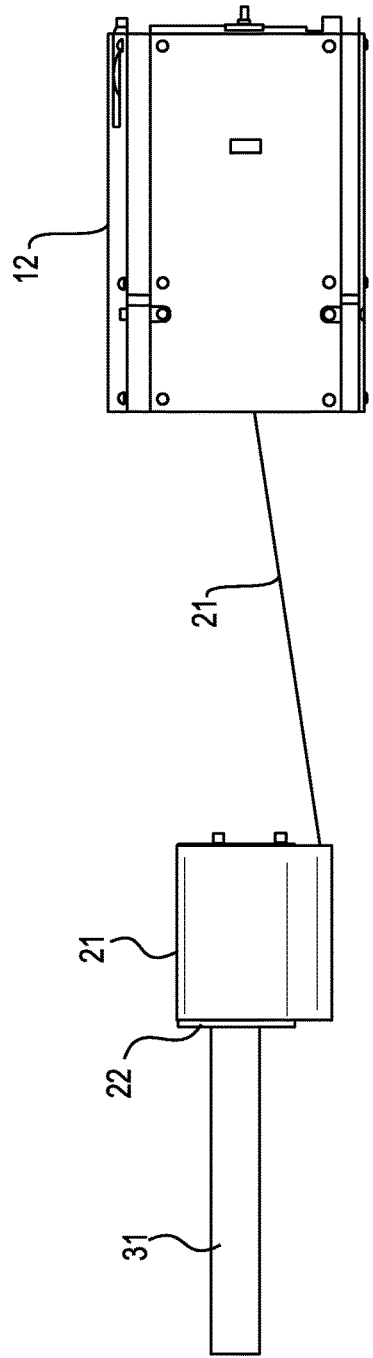

FIG. 3C shows the stacer as begins to extend and push the endmasses 11 and 12 apart, and FIG. 3D shows the stacer as it extends further. As the stacer reaches its full extension length, the spool 22 and tether 21 are pulled from the cavity in the S endmass 12. An end of the tether 21 is affixed to an interior point on the bulkhead of the endmass 12, offset from the centerline. The tether 21 begins to unwind from the spool 22 as the endmasses 11 and 12 are pulled apart by their momentum in the direction of motion established by the extension of the stacer. FIG. 3D shows the tether 21 and spool 22 being pulled from the S endmass 12 and the tether 21 unwinding from the spool 22.

The single stacer spring 31 may impart some roll (rotation about the deployment axis) on the two endmasses 11 and 12. Such rotation may be opposed by a restoring torque produced by the unreeling tether as it gently tugs on the end of the stacer.

Note that the endmasses, the spool, the stacer, and the tether are all in relative alignment along an axis between the two endmasses. The stacer has a long moment arm on the R endmass 11 to which it is attached, so the stacer 31 will maintain itself along the axis of the unreeling tether 21. This allows the tether 21 to be pulled without interruption from the tether spool 22. The extended stacer forms a stiff boom that is inherently resistant to bending and rotation. If the stacer were replaced with a different type of spring with less stiffness, length, and rigidity, the dynamics of the tether spool could allow the tether to stop unreeling, causing the endmasses to stop their outward motion before reaching their full separation distance.

Figure 3F:
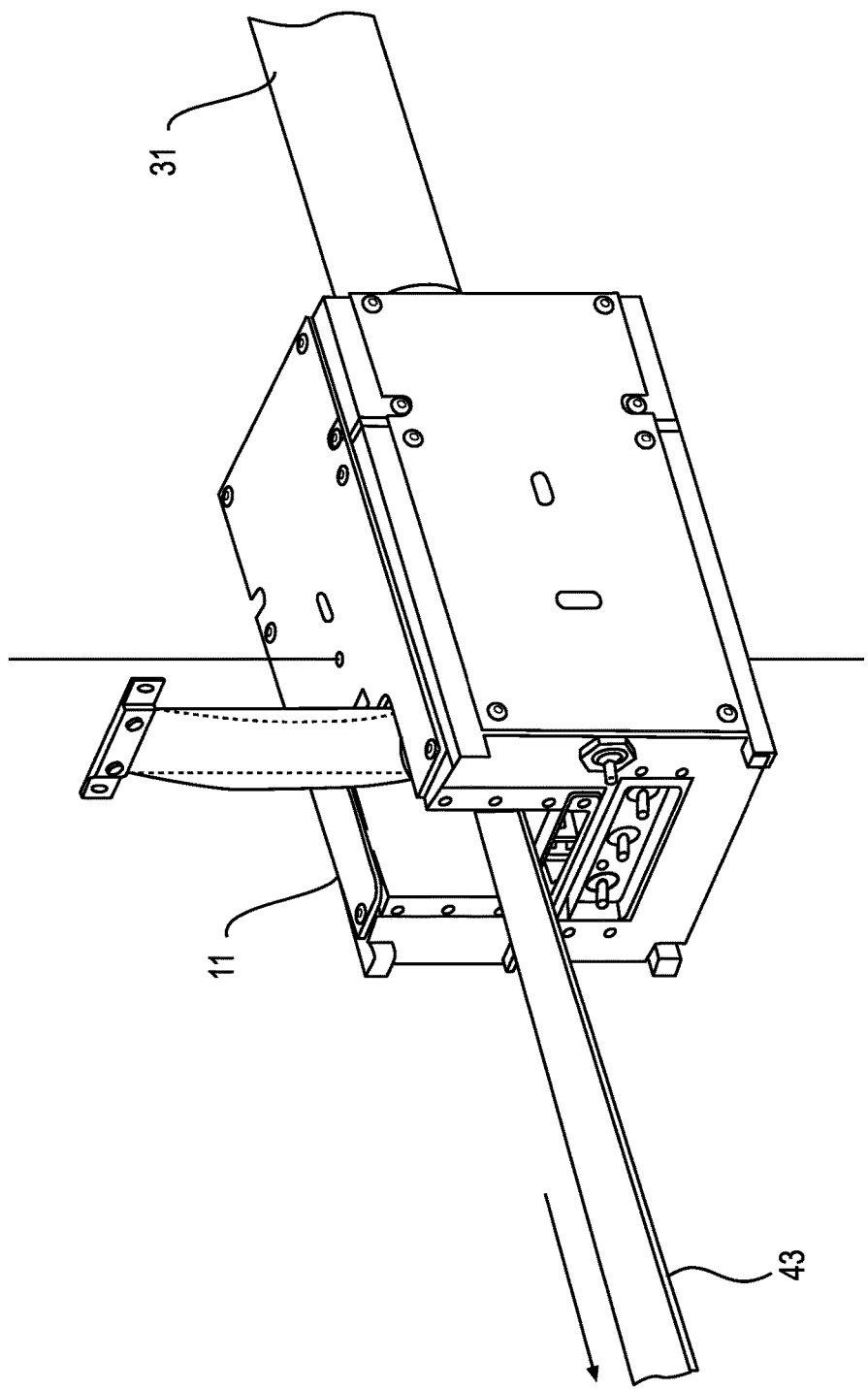
Figure 3G:
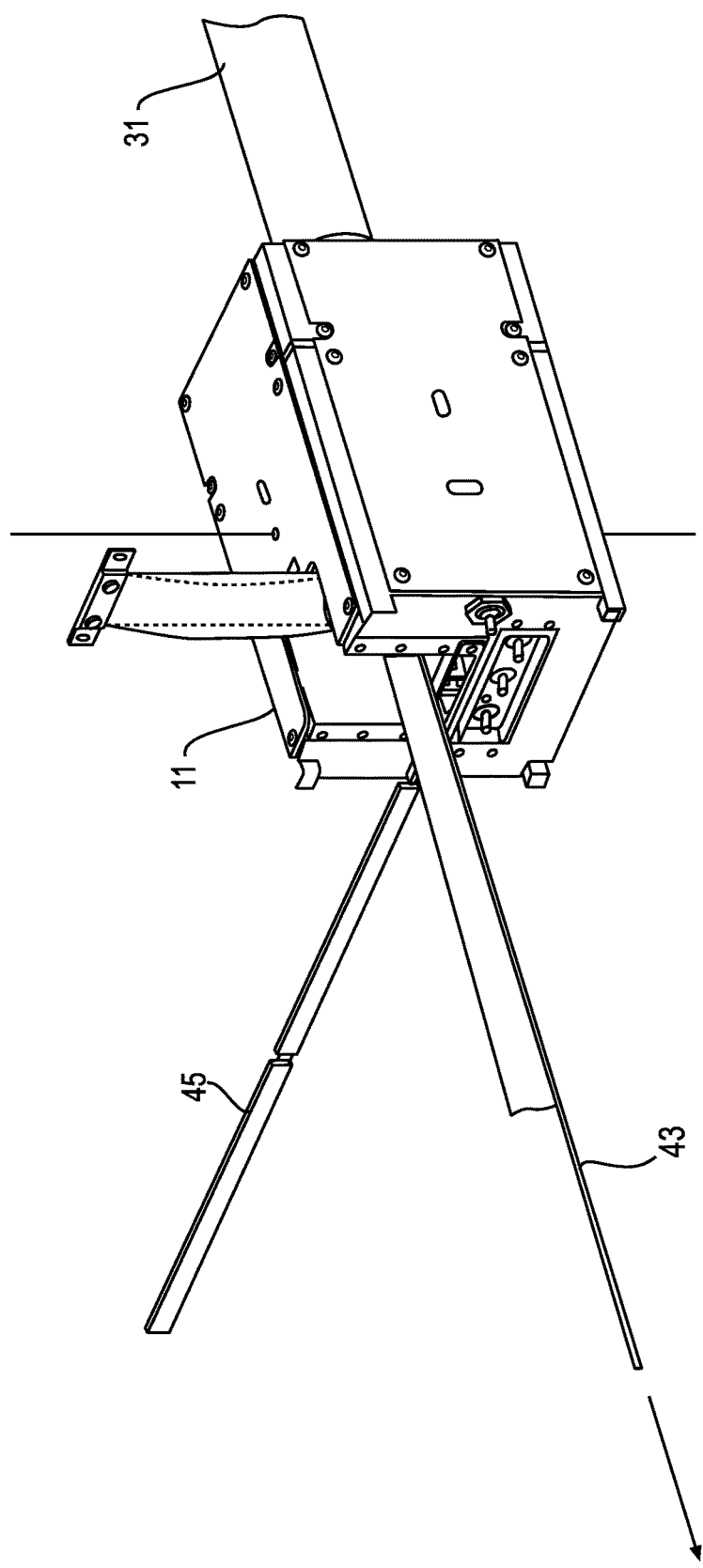

As shown in FIG. 3F, when the endmasses are fully extended, the collector tape 43 and impedance probe 45 can be deployed from the endmasses.

Figure 4A:
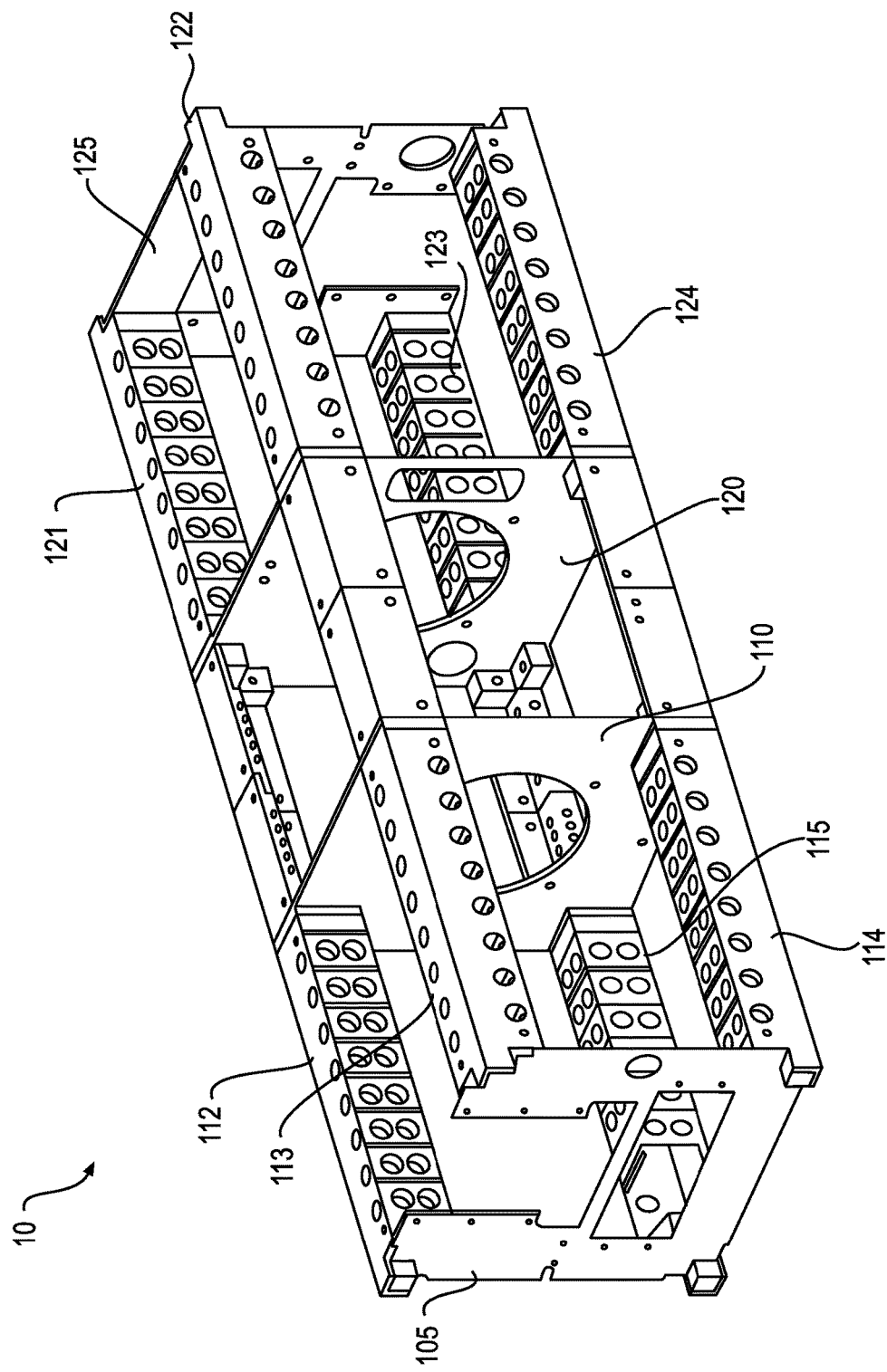
FIG. 4A shows the spacecraft frame components for the two endmasses of the spacecraft.

FIG. 4A shows the spacecraft 10 frame components for endmasses 11 and 12. For endmass 11, an end panel 105 is affixed at its corners to the ends of the rails 112, 113, 114, and 115. Bulkhead 110 is affixed to the opposite ends of the rails 112, 113, 114, and 115. Similarly, the endmass 12 has an endpanel 125 and bulkhead 120 affixed to rails 121, 122, 123, and 124.

The bulkheads 110 and 120 provide a structure for attaching the tether and stacer assemblies to the endmasses. The end panels 105 and 125 provide attachment points for the spacecraft collector housing and emitter. Additional rails are affixed to between the bulkheads, forming a frame for the central portion of the spacecraft that surrounds the stacer/tether assembly. These rails abut each other at the separation plane between the endmasses.

Figure 4B:
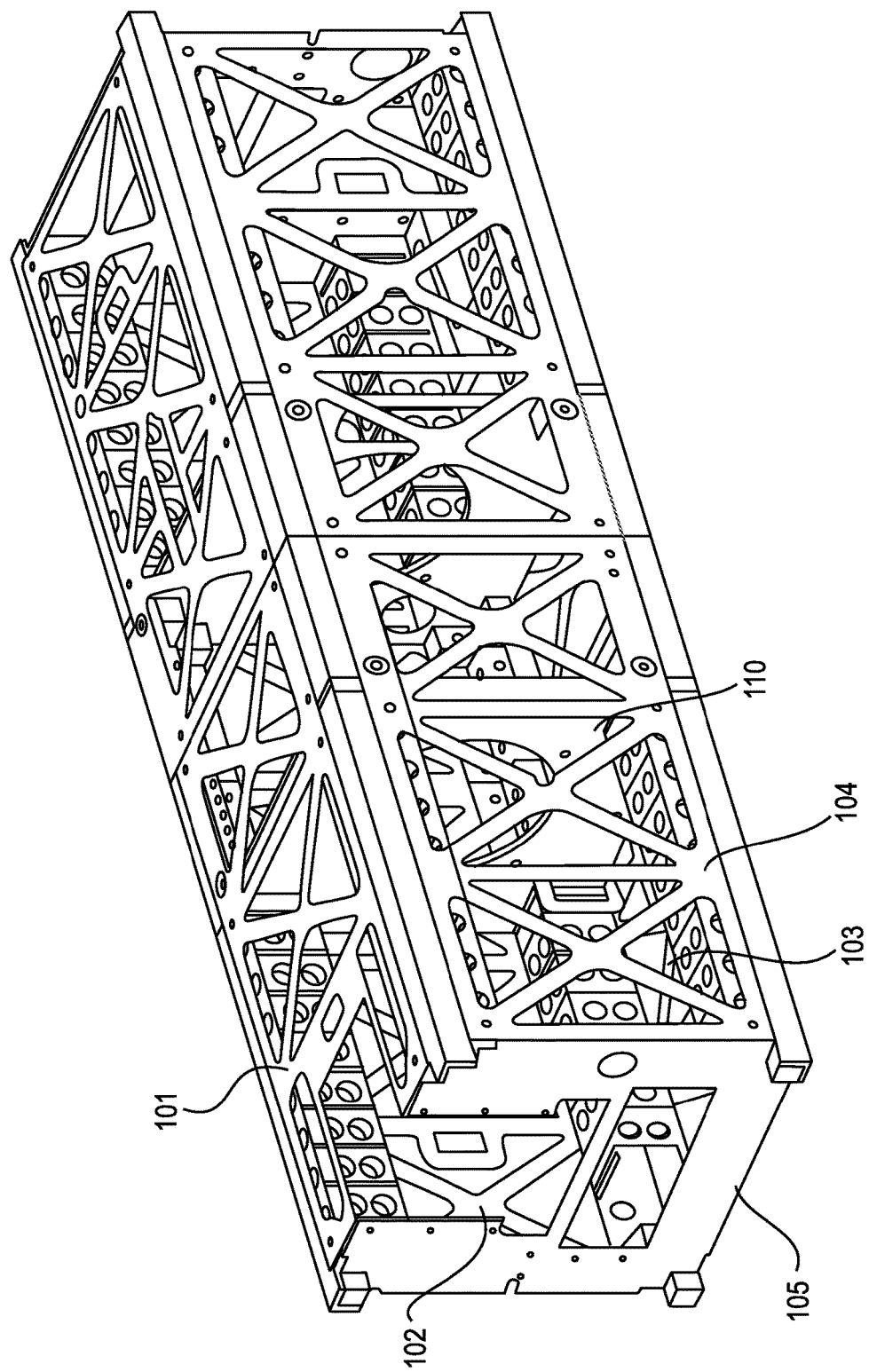
FIG. 4B shows the spacecraft frame components with the addition of exterior support panels.

As shown in FIG. 4B, exterior support panels 101, 102, 103, 104 can be affixed to the rails of R endmass 110. Solar panels (not shown) can be mounted to the exterior support panels.

Figure 4D:
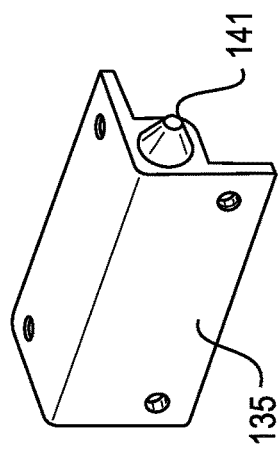
FIGS. 4C, 4D, and 4E show the interface between rails of the two endmasses at the central portion of the spacecraft in more detail.
Figure 4E:
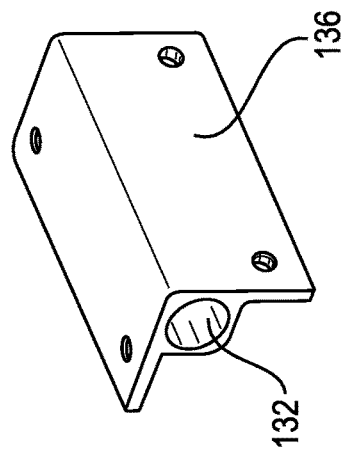
Figure 4C:
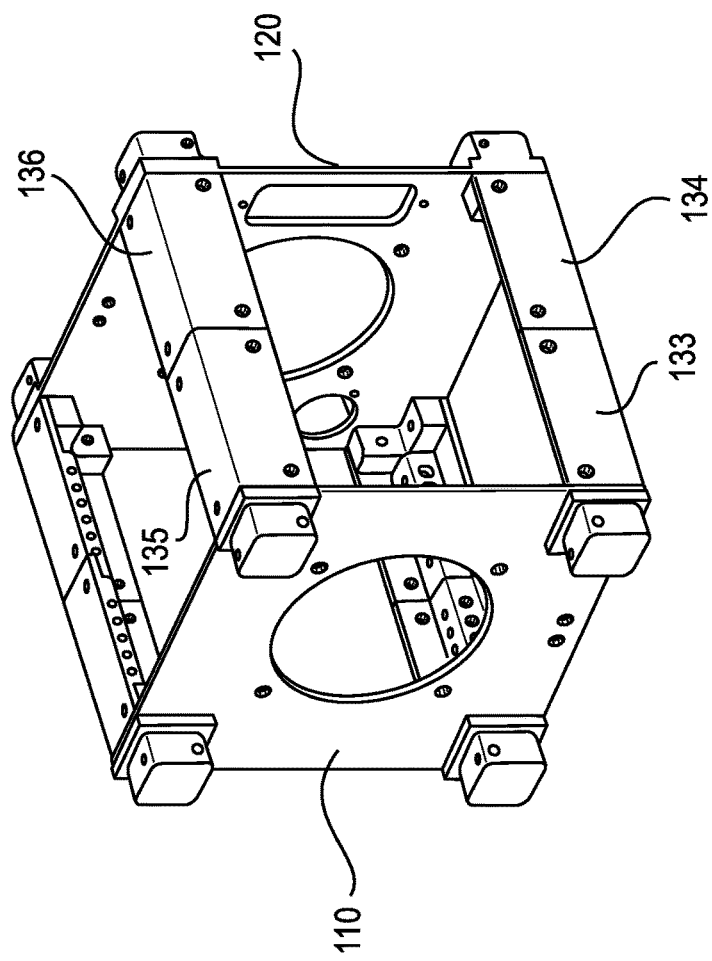

FIG. 4C shows the central module frame portion of the spacecraft 10 in more detail. The stacer and tether are mounted within this frame, and are supported on either end by the bulkheads. The rails 131, 133, 135, and 137 connected to the bulkhead 110 abut, at the separation plane, the opposite rails 132, 134, 136, 138 that are connected to the bulkhead 120.

In a preferred embodiment, the abutting rails on the endmasses 11 are shaped so they are easily aligned, with one rail having a protuberance that fits into a cavity on the abutting rail. For example, FIG. 4D shows a conical protuberance 141 on the rail 135 that fits into the conical cavity in the rail 142 (i.e. a cup-cone interface). This design corrects and allows for small misalignments when the system is stowed.

Figure 5B:
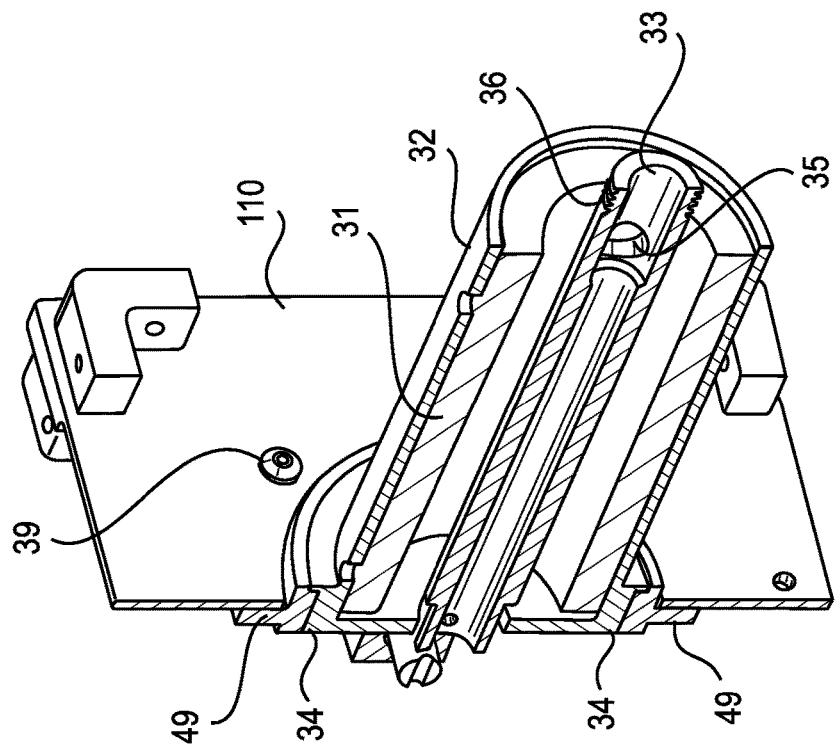
FIGS. 5A and 5B show an exemplary stacer spring assembly of the endmass separation system of the spacecraft.
Figure 5A:
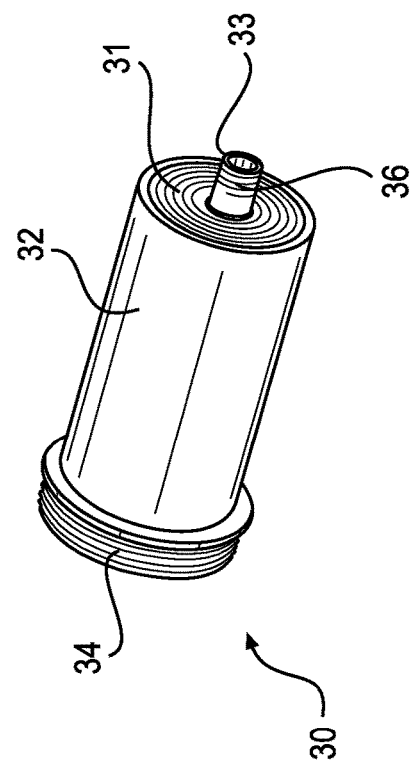

FIGS. 5A and 5B illustrate an exemplary stacer assembly 30 suitable for use in the spacecraft 10. FIG. 5B is a cutaway view of the stacer assembly when attached to the endmass 11 bulkhead 110. The stacer spring 31 preferably is formed of a stainless steel spring material. The stacer spring 31 is a telescoping coil of flat spring material that helically uncoils along the axial direction. The stacer 31 is housed within a cylindrical housing 32, and is wound around a hollow center rod 33. The end of the stacer housing 32 can have a threaded outer surface 34 for threaded connection to the R endmass 11 bulkhead 110 via a bulkhead insert, as shown in FIG. 5B. The hollow center rod 33 has a threaded end 36 opposite the threaded end 34 of the stacer housing 32, for threaded attachment to an end of the tether spool 22, as will be shown in later figures. Near the threaded end 36 of the stacer assembly's hollow center rod 33, a hole extends through the center rod, providing an attachment point for the stacer spring 31.

The cylindrical stacer housing 32 has an end with its outer circumference end having a screw thread that matches the interior screw thread on the bulkhead insert 49. The bulkhead insert 49, as shown in FIG. 5B and in later figures, is bolted 39 to the R endmass bulkhead 110 at each of four corners of the insert. The bulkhead insert 49, or "stacer isolator" is formed of an electrically non-conductive material, such as Torlon 4203. The threaded connection between the stacer isolator and the stacer housing end can also be epoxied to avoid any loosening due to thermal expansion and compression or vibration.

Figure 6A:
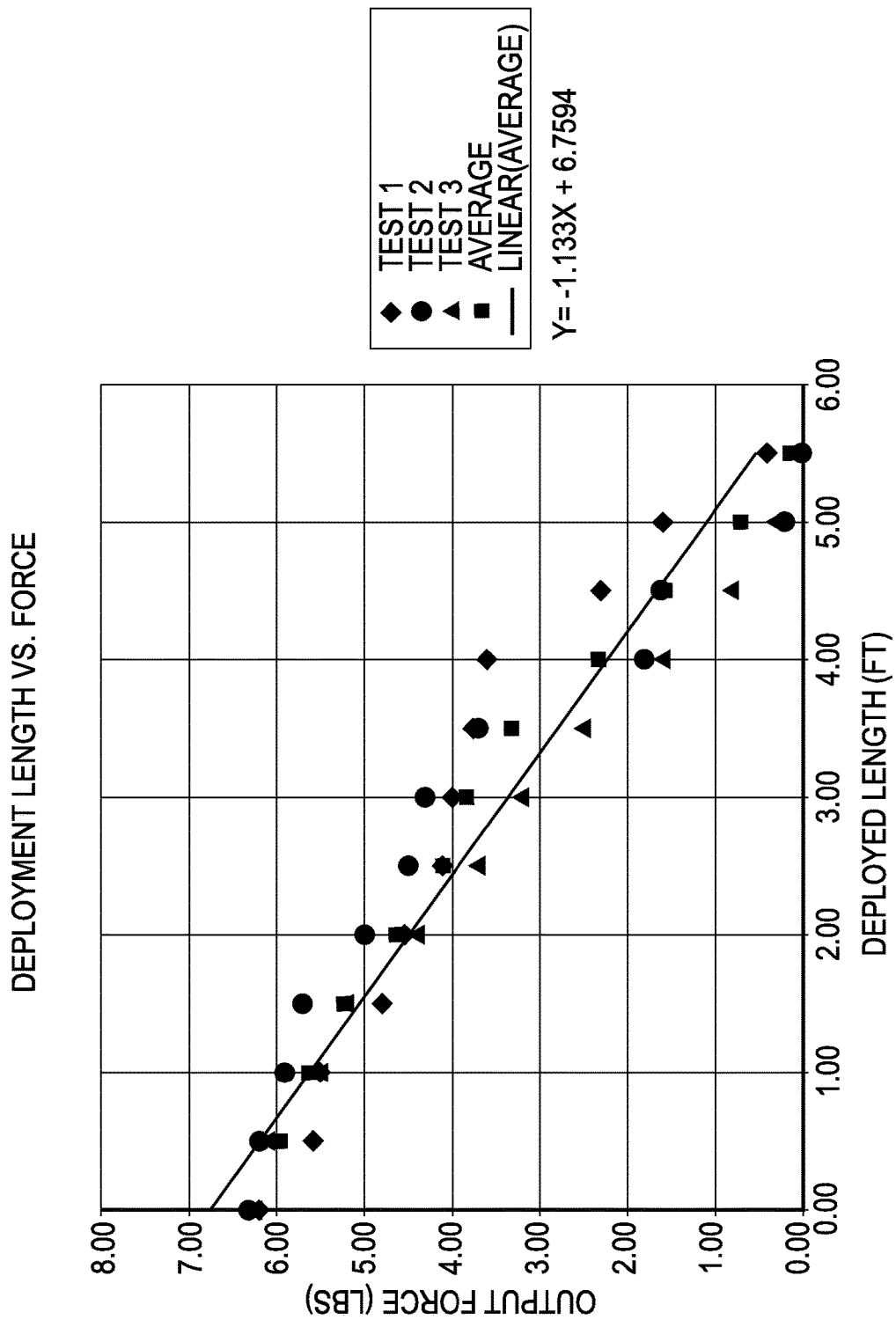
FIGS. 6A and 6B are graphs showing deployment length versus output force and revolutions versus deployment length for stacer springs.
Figure 6B:
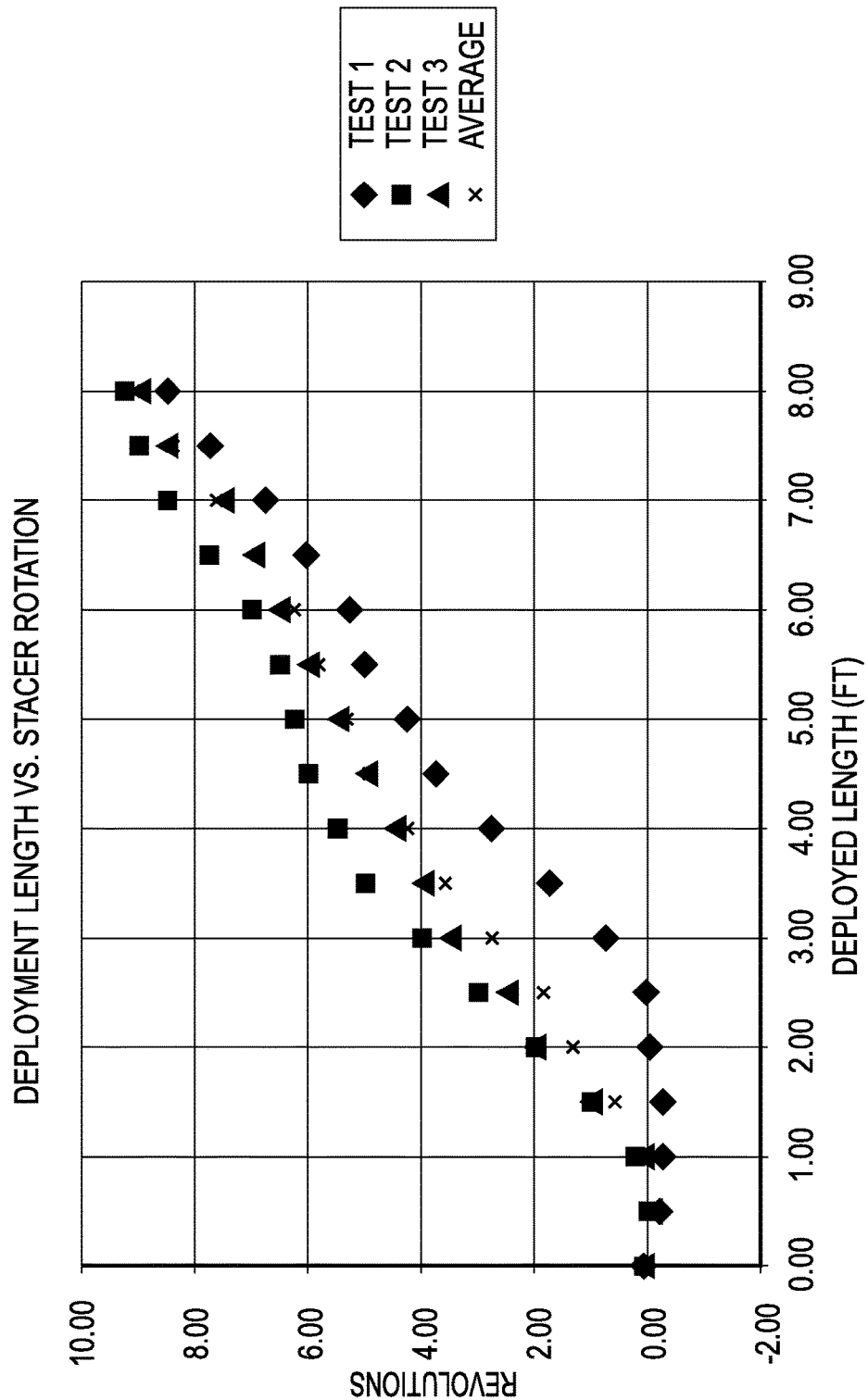

The stacer spring characteristics can be selected for a particular application based on the mass of the endmasses and desired extension length. Preferably the deployment will not have much energy left in the system as the tether reaches its full extension length. If significant energy is present in either endmass at the end of the deployment sequence, it can be dissipated with a braking system to avoid bounce back or damage to the tether. For a spacecraft with small endmasses and a desired tether length of about one kilometer, a suitable stacer could have a free, fully extended length of approximately six to eight feet, and have roughly a 26 Newton initial force, which equates to approximately 27 Joules of stored energy when coiled. In one example, the mass of the stacer assembly is about 485 grams, and has a housing length of about 3¼ inches, allowing the stacer to fit within the central portion of the small spacecraft 10. Tests are performed in selecting an appropriate stacer for an application. It is preferred that the stacer have a linear relationship between output force and deployed length. FIG. 6A shows the results of testing a prototype stacer having good linearity between output force and deployed length. FIG. 6B shows a correlation of revolutions at the center rod as a function of deployed length.

Figure 7A:
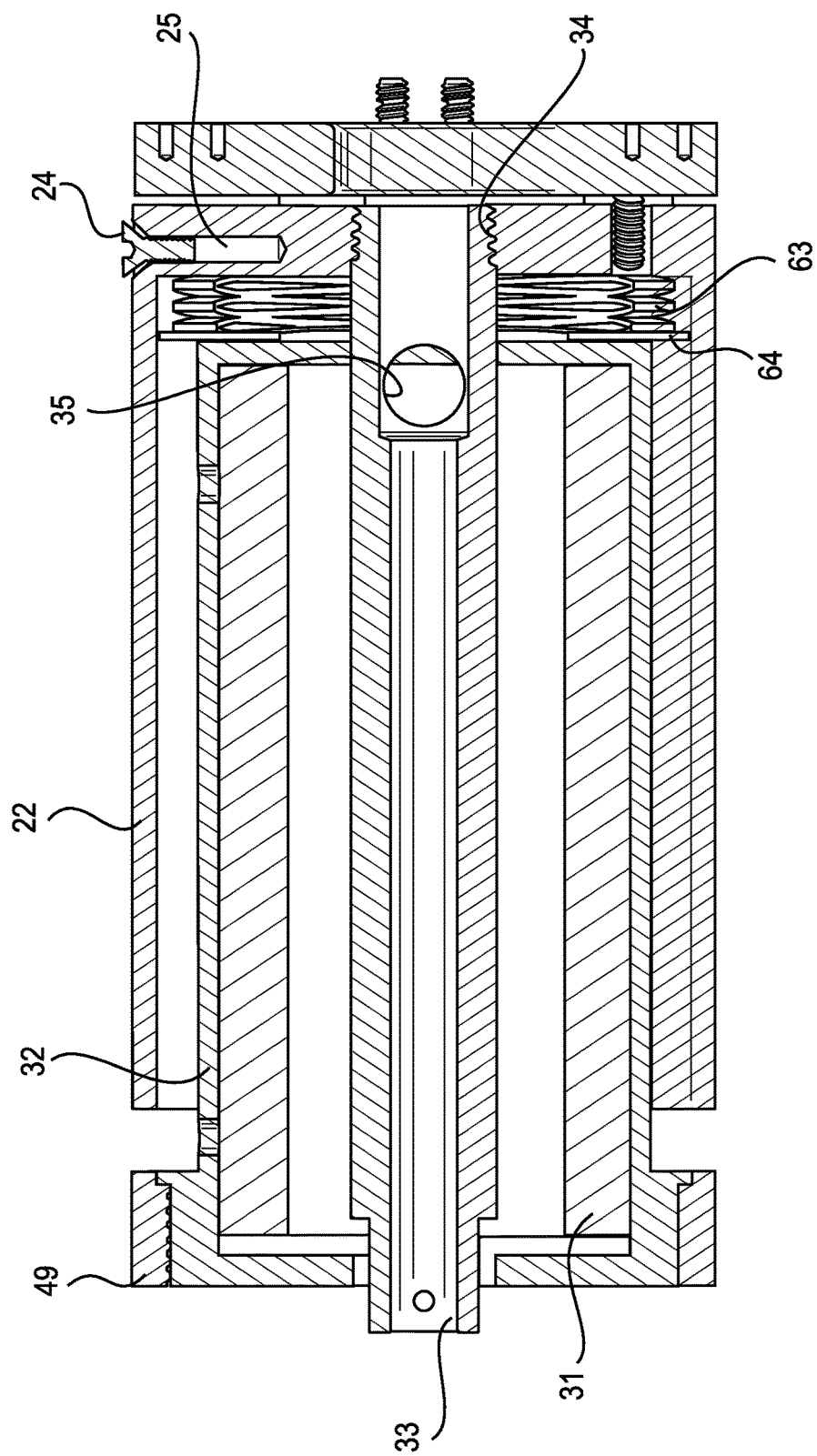
FIGS. 7A and 7B show the tether spool-stacer assemblies in an initial configuration, and after kickoff spring deployment, respectively.

FIG. 7A is a cutaway view of the stacer assembly 30 and tether spool 22 in a stowed configuration. The threaded outer surface 34 of the stacer center rod 33 threads into a threaded hole in the end of the tether spool 22. The tether spool 22 also has an attachment point (or "tether mount") 24/25 at which the tether 21 is attached to the spool 22. A countersunk screw 24 clamps an end of the tether 21 in the threaded hole 25 in the side of the spool 22. The tether mount keeps the end of the tether 21 from being released from the spool 22 as the separating endmasses 11 and 12 reach their maximum separation distance. This attachment point provides both the electrical and mechanical connection for the tether to the rest of the system.

The tether 21 (not shown in FIGS. 7A and 7B) is wrapped around the outer circumference of the tether spool 22.

An end of the stacer spring 31 is affixed to the stacer assembly hollow center rod 33. In this example, the stacer spring 31 is affixed by riveting the stacer spring 31 to the center rod 33 through the opening 35 in the center rod 33.

The separation system can also include a kickoff spring 63 that initially pushes the stacer assembly 30 longitudinally outward away from its original stowed position in the interior cavity of the tether spool 22. In this example, the kickoff spring 63 is a shimmed wave spring custom built by the Smalley Steel Ring Company in Lake Zurich, Ill., USA. The wave spring has a free height of about 1¼ inches, a solid (compressed) height of 0.116 inches, and clears and operates in a 1.85 inch bore diameter. The spring has an inside reference diameter of 1.45 inches. The spring operates with a load of 12 lbf at 0.25 work height and 3.2 lbf at 1.00 inch work height.

A separation washer 64 and the compressed kickoff spring 63 are housed within the spool 22 at the end nearest the threaded connection between the spool and the stacer center rod 33. This separation washer 64 acts as an interface plate to transfer the spring load between the kickoff spring 63 and the stacer housing 32.

Figure 7B:
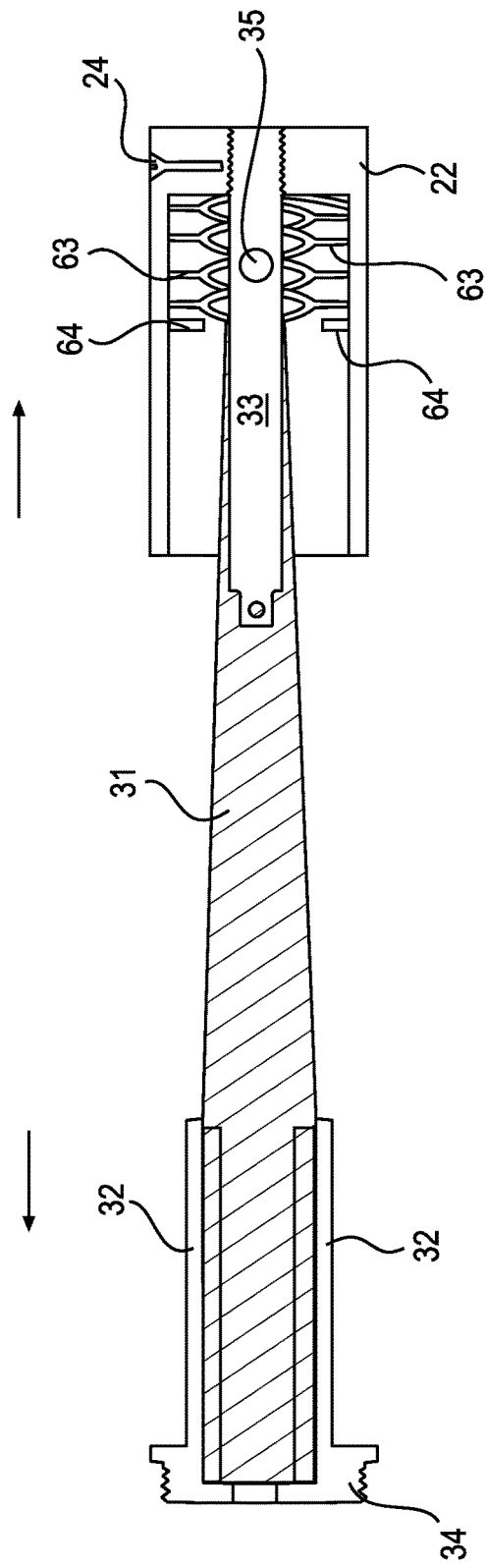

The stacer housing 32 fits inside the inner diameter of the tether spool 22. When the stacer assembly 30 is fit inside the spool 22, the end of the stacer housing presses against the separation washer 64, compressing the kickoff spring 63. As seen in FIG. 7B, when deployed, the kickoff spring 63 pushes the stacer housing 32 and stacer spring 31 so they slide longitudinally out of the spool 22 as the stacer spring 31 unspools, leaving the hollow stacer center rod 33 behind, still threaded into the end of the spool 22. The stacer spring 31 pushes against the end of the stacer housing 32, which is threaded into the R endmass 11 bulkhead 110, thus pushing the R endmass 11 longitudinally away from the S endmass 12.

In an exemplary embodiment, the R and S endmasses 11 and 12 are initially held together by a loop preloaded in tension, and redundant burn wire release mechanisms cut the loop when activated, to allow the stacer deployment sequence to begin.

Figure 8A:
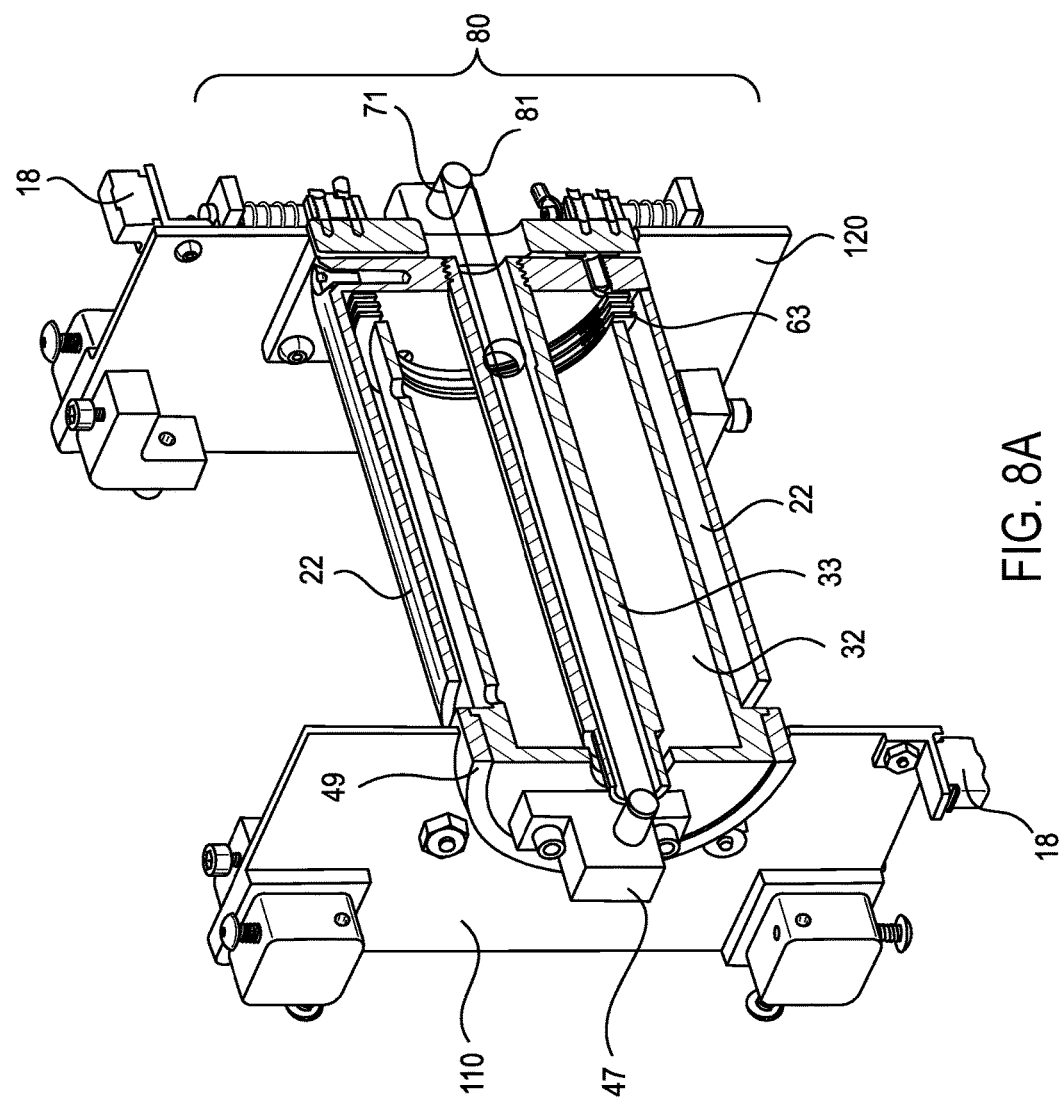
FIG. 8A shows the tether spool-stacer assemblies in a stowed configuration, positioned between the endmass bulkheads with a vectran closure loop holding them together.

FIG. 8A is a cutaway view of the central portion of the spacecraft 10, illustrating the separation mechanism between endmasses 11 and 12 in more detail. Note that the tether material 21 and stacer spring 31 are not shown in this figure. Initially, the R and S endmasses 11 and 12 are held together by a loop 71 preloaded in tension. In this example, the loop is made of a spun liquid crystal polymer, commercially available under the registered tradename VECTRAN, and manufactured by Celanese Corporation, headquartered in Dallas, Tex., USA. The loop could be, for example, VECTRAN BVT 150 with twelve braided 400 denier strands. The preloaded loop 71 extends through the length of the hollow stacer center rod 33, and through a hole in the bulkhead 120 of the endmass 12, where it is looped over a fixed rod 81. The other end of the loop 71 extends through a hole in the bulkhead 110 of the R endmass 11, with a tensioning reel 47 in position at the bulkhead 110 to keep the loop in tension.

VECTRAN is a preferred material for the loop 71 due to its low creep over a wide temperature range and tensions as well as its resistance to self abrasion and its flight heritage. Other materials, including polymers, may also be suitable if they have low creep, strength sufficient to initially hold the endmasses together over the spring forces and preload the system, and can be cut through by a heated nichrome burn wire.

Figure 8B:
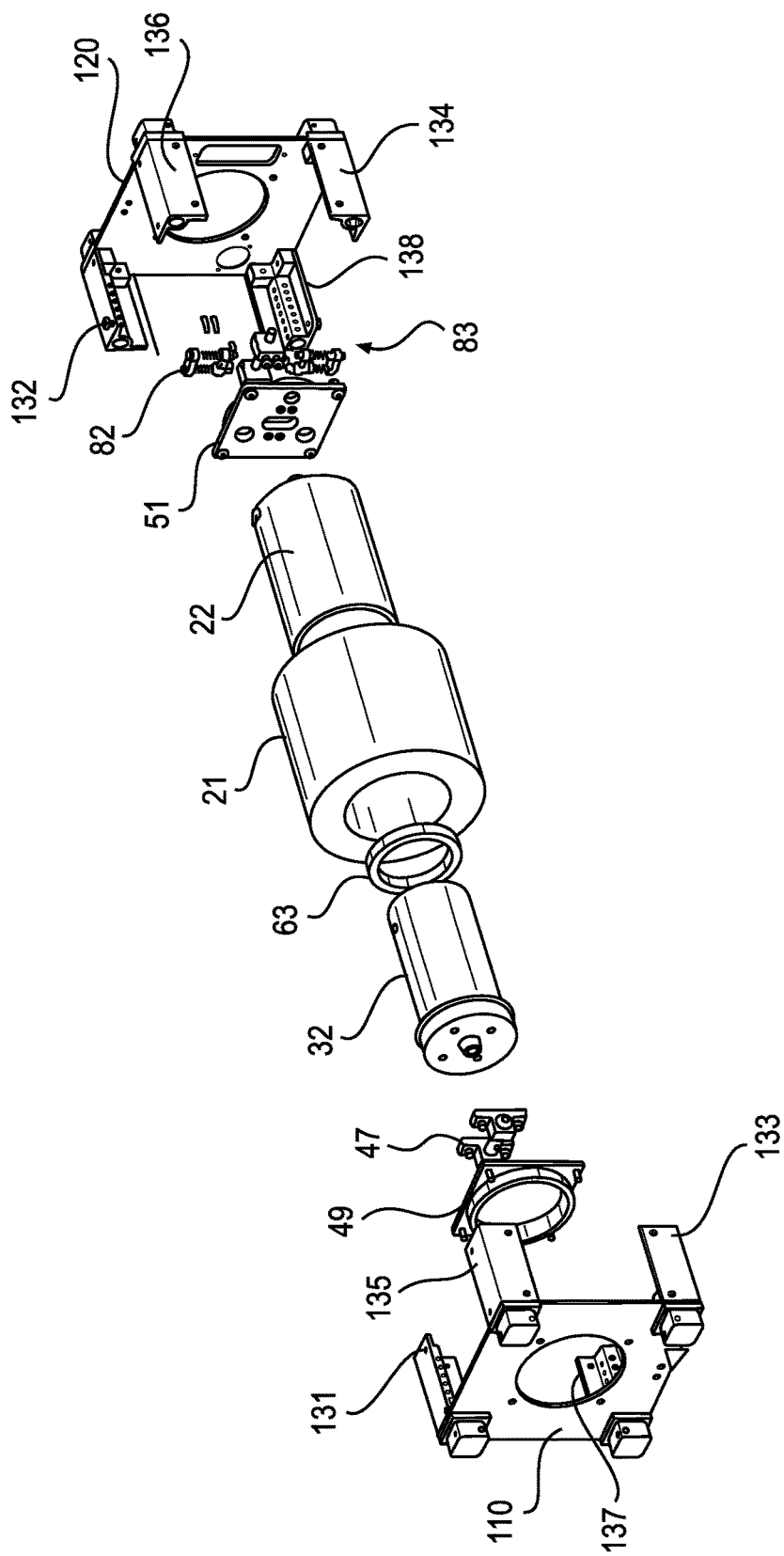
FIG. 8B is an exploded view of the tether spool-stacer assemblies, the release mechanisms, the tensioning mechanism, the endmass bulkheads, and the central frame portion.

FIG. 8B is an exploded view of the central module between the endmass bulkheads. Note that the loop 71 material and the separation washer 64 are not shown in this figure.

Figure 9A:
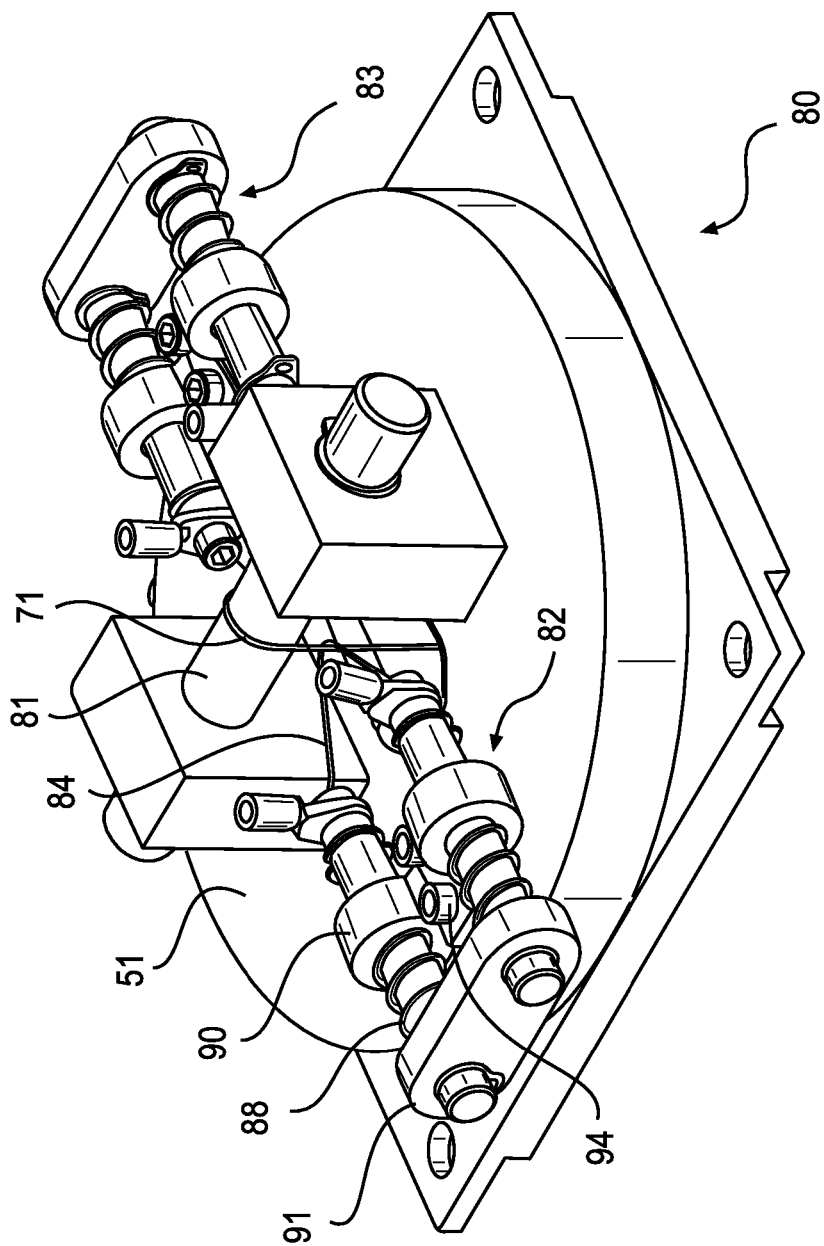
FIGS. 9A, 9B, and 9C show an exemplary burn wire release system for the tethered spacecraft.
Figure 9B:
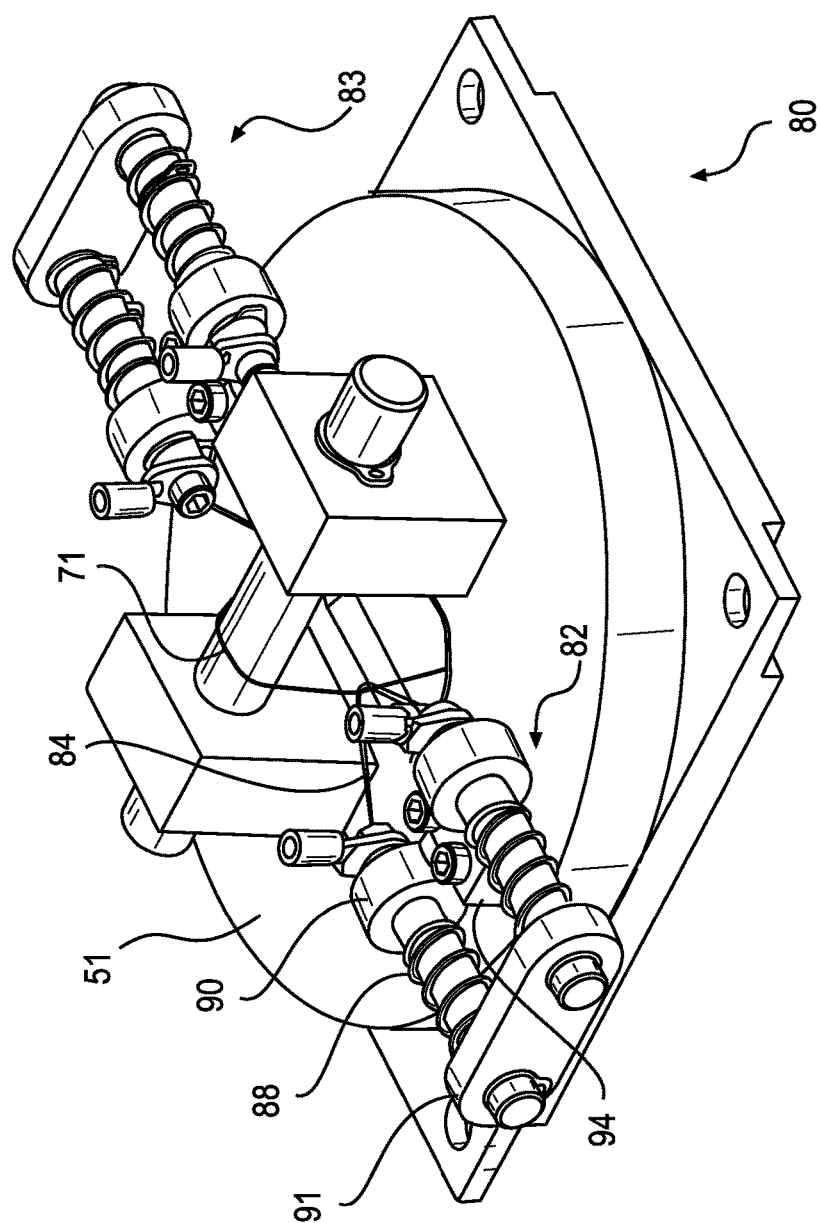
Figure 9C:
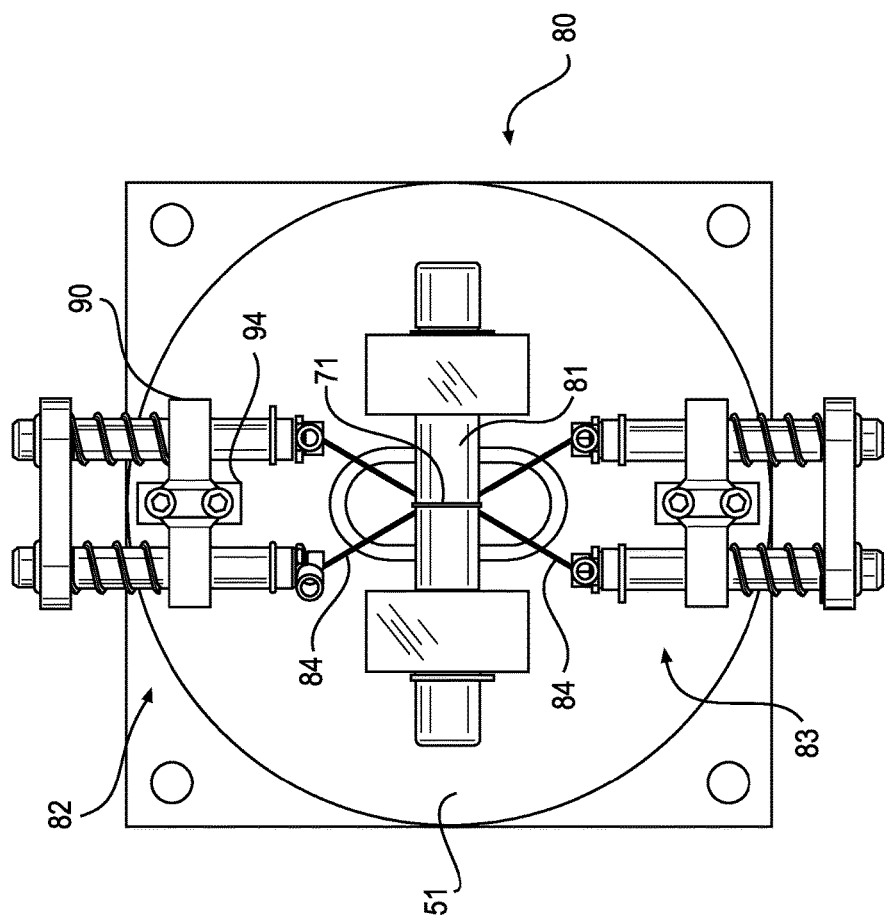

FIGS. 9A, 9B, and 9C show the burn wire release system 80 including two burn wire release mechanisms 82 and 83, each positioned within the S endmass 12, to burn through the loop 71 that initially holds the endmasses together. The release mechanisms 82 and 83 are affixed by bolts to a bulkhead insert plate 51 that in turn is bolted to the S endmass bulkhead 120. The release mechanisms 82 and 83 are electrically isolated from other metal components in the system via selective anodizing of components in the assembly. As seen in FIG. 9A, the loop 71 passes over a raised fixed rod 81 and extends through an opening in the insert plate 51 and in the bulkhead 120 and stretches toward the tension mechanism opposite R bulkhead 110.

Each of the burn wire mechanisms 82, 83 has a nichrome wire 84 that is heated by an electrical current. When the burn wire mechanisms are activated, current flows through the nichrome wires, heating the wire 84 and burning through the loop 71 material.

FIGS. 10A and 10B illustrate one of the two redundant burn wire release mechanisms 82 in more detail. Each end of the nichrome wire 84 is held between a head of the screw 85 and a ring terminal 87. The ring terminals provide the electrical interface to the mechanism with two flying leads. The release mechanism 82 utilizes a two saddle design with compression springs 88 to apply a spring stroke and preload the nichrome wire 84 against the loop 71 material. When a controlled current is applied to the nichrome wire 84, the nichrome burn wire 84 heats up and melts through the cable loop 71.

The burn wire release mechanism 82 uses two dowel pins 89, each with a compression spring 88 situated between an upper saddle 90 and a lower saddle 91. The saddles 90 and 91 and the compression spring 88 are held in position using external tab style snap rings 92, 93 placed in grooves machined into the dowel pins 89. The snap rings 92, 93 are positioned to distance the saddles apart from one another by a length just smaller than the compression spring free length. This causes the compression springs 88 to be slightly preloaded and ensure very little movement during vibration.

Both the upper and lower saddles 90, 91 can be formed from aluminum 6061 that has been hard anodized in order to prevent an electrical short between the dowel pins and either of the saddles.

At the electrical connection end, the dowel pins each have a drilled and tapped #0-80 screw 85 on the end that is used to secure the nichrome wire and the electrical connection to the dowel pin. Two flying leads are crimped to ring terminals 87. The #0-80 button head screws 85 are fastened to the dowel pins 89 through the bore of the ring terminal 87, with the nichrome wire 84 being wrapped around the screw 85 under the button head. The screw 85 is then tightened to form a secure connection between nichrome wire 84 and the ring terminal 87, providing a good connection to the spacecraft power supply.

The upper saddle 90 contains a base 94 that has two through-holes for #0-80 screws which then attach to the spacecraft structure on which the release mechanism will be supported. Referring momentarily to FIG. 9A, 9B, or 9C, it is seen that the burn wire release mechanisms are attached by the bases 94 to the insert plate 51, which in turn is bolted to the S endmass 12 bulkhead 120 (not shown).

FIG. 10A shows one of the two release mechanisms 82 in its resting position, with the compression springs 88 extended. With the upper saddle 90 attached to a base (e.g., to the insert plate 51 shown in FIG. 9A, 9B, or 9C), the lower saddle 91 can be pushed toward the upper saddle 90 to compress the springs 88, as shown in FIG. 10B. The VECTRAN cord 71 is then passed through the loop of nichrome burn wire 84. Once the cord is routed through the loop of the nichrome wire, the lower saddle 91 can be released, as shown in FIG. 10B, the cord 71 is pulled taut, and nichrome burn wire 84 will be preloaded against the loop cord 71. Once the burn wire release mechanism springs 88 have been released, the springs will push the lower saddle 91 away from the upper saddle 90, pulling the dowels ends and the nichrome wire 84 toward the lower saddle. The outward movement of the nichrome wires ensures contact between the nichrome wires and the loop 71 (preload).

Referring again momentarily to FIG. 9A, it is seen that both mechanisms 82 and 83 are shown with the springs compressed. FIG. 9B shows the mechanisms 82 and 83 with the springs released and the cord loop 71 in contact with and preloaded or pulled into tension by the nichrome burn wires 84 of the release mechanisms 82 and 83. FIG. 9C is a top view of the release system 80, with the cord loop 71 in contact with and preloaded against the nichrome burn wires. The two burn wires provide redundancy, so that in operation, only one of the two burn wire release mechanisms must successfully operate for the loop 71 to be released, allowing the two endmasses to separate. The free length of the nichrome wire 84 can be specified by the user based on their available space and desired spring stroke of the burn wire release device 82. However, a nichrome wire free length of less than 0.4 inches can cause too much of the heat from the nichrome wire to be dissipated to the surrounding components (e.g., the 0-80 bolts) and cause the release device to fail to cut the loop 71 in air. Additionally, a free length of greater than 1.25 inches can cause the nichrome wire to overheat if left on for an extended period of time in vacuum and damage the nichrome wire 71. Therefore, a free length between about 0.4 and about 1.25 inches is recommended for functionality of a nichrome wire in both air and vacuum settings.

Tests of the burn wire release mechanism were conducted by allowing the nichrome wire to heat up (received current) for 30 seconds during each deployment. With nichrome wire free lengths of less than 1.25 inches, the nichrome wire did not overheat. When selecting the free length of the nichrome wire it is important that the release mechanism has ample spring stroke to cut through the VECTRAN cable with the allowable deflection of the cable. Particularly in vacuum where radiation heat effects cannot be taken advantage of, the nichrome wire 84 should completely stroke through the VECTRAN cable in order to ensure a successful cut. If the spring stroke (or preload) between the wire 84 and the loop 71 is lost before the entire cable is cut then it is possible for the nichrome wire to remain stuck in the VECTRAN cable loop 71 without severing it enough to have a successful cut.

The nichrome wire gauge can be selected to have sufficient strength and to survive at the maximum current for at least as long as the nichrome wire takes to cut through the loop 71 material. The electrical current can be selected to be at least enough to cut through the VECTRAN loop material 71 in both air and in vacuum. In this example, a suitable nichrome wire is 30 AWG, with a diameter of 0.01 inches, and the current is 1.6+/−0.05 Amperes. Testing different wire gauges showed that as the wire diameter was decreased the overlapping section of the current needed for success in both air and vacuum was decreased, while nichrome wire sizes larger than 30 AWG required higher amounts of current to be applied. The 30 AWG nichrome wire provided a suitable middle ground for satisfying both conditions.

The burn wire release mechanism current can be matched to an appropriate burn wire. To help optimize the design, the current at which the nichrome wire failed under the tensile load of its own wire weight was measured, and is shown in Table 1 below. This data shows that the upper bound of the nichrome wire failure current is established at 1.90 Amps for 30 AWG wire. In this instance, the nichrome wire is type Chromel C by McMaster-Carr (type Chromel C).

TABLE 1

| Nichrome Wire Resistive Length (in) | Resistance (Ω) - as measured from screw to screw | Failure Current (Amps) | Failure Time (sec) |
|---|---|---|---|
| 0.5 | 0.8 | 2.15 | 7 |
| 0.75 | 1.1 | 2.05 | 7 |
| 1 | 1.5 | 1.95 | 7 |
| 1.25 | 1.3 | 1.95 | 9 |
| 1.5 | 1.5 | 1.9 | 10 |
| 1.75 | 1.6 | 1.95 | 14 |
| 2 | 1.8 | 1.9 | 20 |
| 2.25 | 2 | 1.9 | 17 |
| 2.5 | 2.1 | 1.975 | 30 |
| 2.75 | 2.2 | 1.975 | 19 |
| 3 | 2.2 | 1.975 | 13 |
| 3.25 | 2.4 | 1.9 | 15 |
| 3.5 | 2.6 | 1.9 | 19 |

Average Failure Current = 1.960 Amps

The cut time for the nichrome wire through the cable was found to also depend on the thickness of the cable. For a release mechanism used for CubeSats and other smaller satellites, two deniers of VECTRAN cable can be selected and investigated: 12 strands in a tubular braid of 200 denier strands and 12 strands in a tubular braid of 400 denier strands, neither having an oil finish. Over 350 tests were conducted in both air and vacuum while varying the applied current to the nichrome wire, the nichrome wire free length, the spring stroke of the release mechanism, the type of cable used and the tension applied to the cable. The number of burn cycles placed on each piece of nichrome wire was also recorded with the intent of the release mechanism being able to be reused a minimum of 50 times. FIG. 11 shows the cut time of the release mechanism through the two different braided cables in both air and vacuum. Here, an electrical circuit supplies the nichrome wire with a constant current of 1.60±0.05 Amps for a minimum of 30 seconds, and provides average cut times of: for 200 Denier VECTRAN in Air, the average cut time is 5.3 sec; for 200 Denier VECTRAN in Vacuum, the average cut time is 2.6 sec; for 400 Denier VECTRAN in Air, the average cut time is 6.2 sec; and for 400 Denier VECTRAN in Vacuum, the average cut time is 3.0 sec. Thus, the burn wire release mechanism will provide cut times in a range of 2 to 7 seconds in either air or vacuum using either of the VECTRAN varieties chosen.

Referring again to FIG. 8A, a tensioning mechanism 47 is positioned at the endmass 11 bulkhead 110, and applies tension to the loop 71 to hold the R and S endmasses 11 and 12 together before release.

Figure 12A:
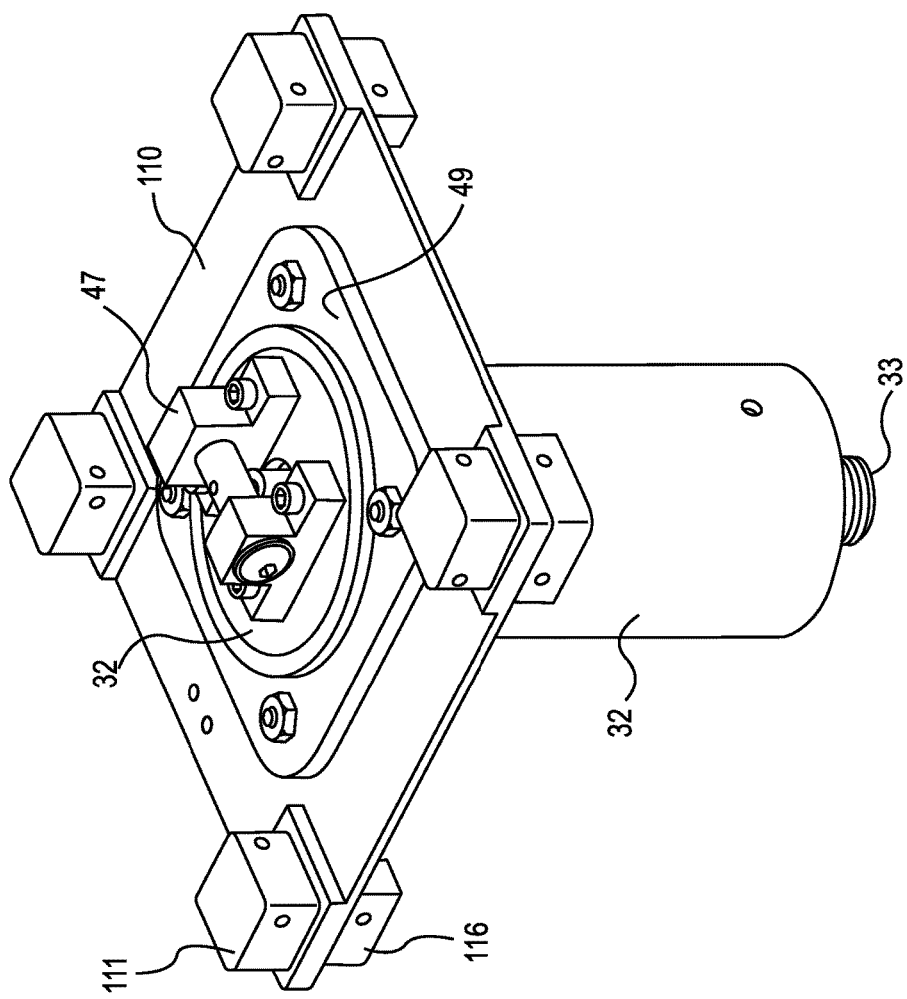
FIGS. 12A and 12B shows the tensioning system for the closure loop.
Figure 12B:
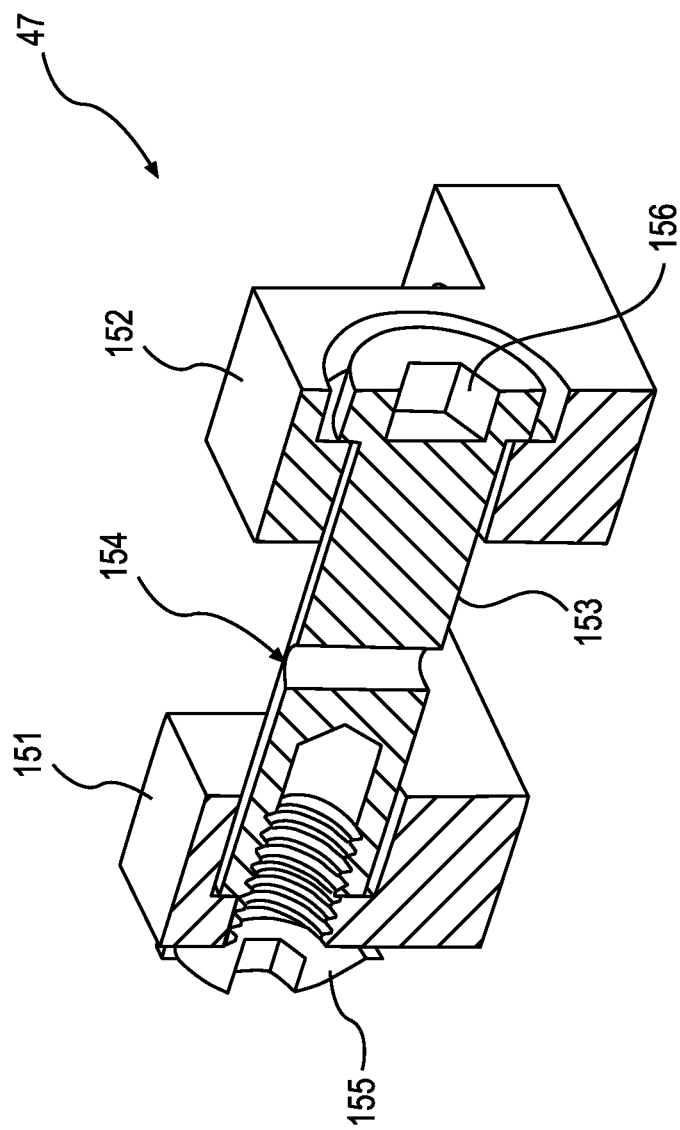

FIG. 12A shows how the tensioning mechanism 47 is positioned on the stacer housing 32 and oriented with the bulkhead 110. FIG. 12B is a cutaway view of the tensioning mechanism 47. Two brackets 151, 152 are bolted to one end plate of the stacer housing 32, which is engaged via threads with the bulkhead insert 49. The bulkhead insert 49 in turn is bolted to the R endmass bulkhead 110. A cylindrical tension rod 153 extends between the brackets, with the ends of the tension rod extending through holes in the brackets. A chamfered hole 154 extends through the cylindrical tension rod 153, approximately midway between the brackets and allows for the loop 71 to be fed through the tension rod 153.

To set the loop 71 in place, a length of VECTRAN cord is looped through the nichrome wires of the release mechanisms 82 and 83 in the S endmass. Next, the ends of the cord are pulled through the center rod 33 to the R endmass. As seen in FIG. 13A, the ends of the cord are then pulled together through the hole 154 in the tension rod 153. Both cord ends are looped around and under the tension rod (or "torque rod") 153 (FIG. 13B). The free ends are then tied together in a knot (FIG. 13C). The tension rod is then torqued via a hex feature 156 in the end of the tension rod 153 to apply a tensile load on the cord, and a clamp screw 155 is tightened to prevent the torque rod from backing out (FIG. 13D).

The recommended lower bound for the tension level in the loop 71 is equal to the combined force of the stacer and the kickoff spring, or approximately 10 lbf+12 lbf=22 lbf. With a safety factor of 2, the lower bound is approximately 45 lbf.

The recommended upper bound for the tension level in the loop 71 is based on the material's breaking strength and the allowable degree of creep. The strength of a single 12 stranded braided VECTRAN line of 400 denier strands is approximately 274 lbs. Multiplying by two for a two line tensioning system provides a cord breaking strength of 540 lbf. VECTRAN has close to zero creep at about 25% of its breaking strength (25% of 540 lb is 135 lbf). With a margin for safety, the upper bound for the tension level in the Vectran cord is approximately 90 lbf. Therefore, the tension level in the Vectran loop 71 should fall within a range of 45 to 90 lbf.

Burn wire release mechanisms are provided in each of the endmasses to release the collector tapes 43 in the R and S endmasses 11 and 12.

The material of the tether 21 preferably includes one or more (for redundancy) electrically conductive elements, so that the tether 21 can be used for electrodynamic propulsion for maneuvering the endmasses. An electrically conductive tether allows the tethered spacecraft 10 to be, for example, a Tethered Electrodynamic Propulsion CubeS at Experiment (TEPCE) satellite, which is a triple cubesat electrodynamic tether system. Once the cubesats are separated, the metallic tether can be used for electrodynamic propulsion for maneuvering the satellites without fuel. Hot-wire electron collectors can be positioned at each endmass, which can drive a current in either direction along the tether, allowing the satellite to climb or descend.

The tether can be approximately one kilometer in length. In a preferred embodiment, the tether is formed in a nine-strand flat braid consisting of six 200 denier strands of Kevlar and three strands of electrically conductive Aracon metal clad fibers (nickel plated, copper coated Kevlar), with each tape strand being 2 mm×0.2 mm in cross section. The mass of a one kilometer tether is approximately 430 grams, with a winding volume of 260 cubic centimeters. The outer diameter of the wound tether, when wrapped around a 2 inch diameter spool is ~3.26 inches in diameter. The tether does not appear to experience significant shrinkage due to vacuum losses.

Design considerations for the tether include tensile strength, volume, outer diameter when wound on a spool, melting temperature, degree of shrinkage, tether width, abrasion resistance, snag resistance, expected degree of meteor severance, and observability (visibility to cameras on the endmasses).

Other alternatives that can be suitable for tethers include braided strands of Spectra and metalized Aracon, braided strands of Kevlar, Spectra, and metalized Aracon.

Referring again to FIG. 13A, it is seen that each corner of the bulkhead 110 has protruding bosses 111 and 116 on opposite faces of the bulkhead to which the structural rails are affixed with screws, bolts, or other mechanical or adhesive attachment devices. In this example, the fittings are machine screws or bolts. Bulkhead 120 is attached to rails in the same manner.

Figure 14A:
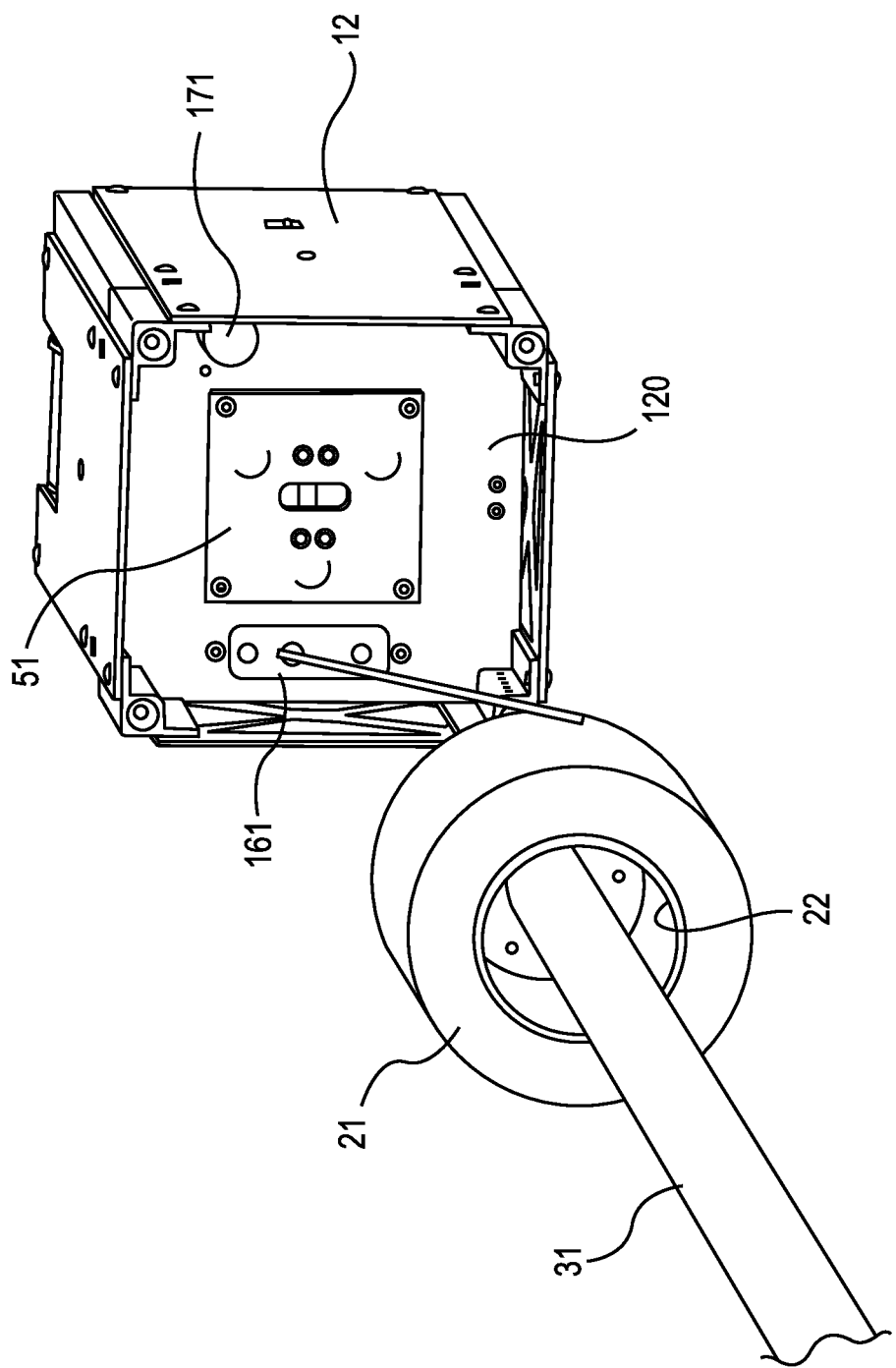
FIGS. 14A, 14B, and 14C show the attachment system for attaching the spacecraft tether to one of the spacecraft endmasses.

FIG. 14A illustrates the interface between the tether 21 and the S endmass 12 in an exemplary embodiment. The bulkhead insert plate 51 is bolted to the S endmass 12 bulkhead 120. A tether interface plate 161 is affixed with bolts or other mechanical or chemical attachment systems to the bulkhead insert plate 51. The tether interface plate 161 is formed of Torlon 4203 or another similarly electrically isolating material.

Figure 14C:
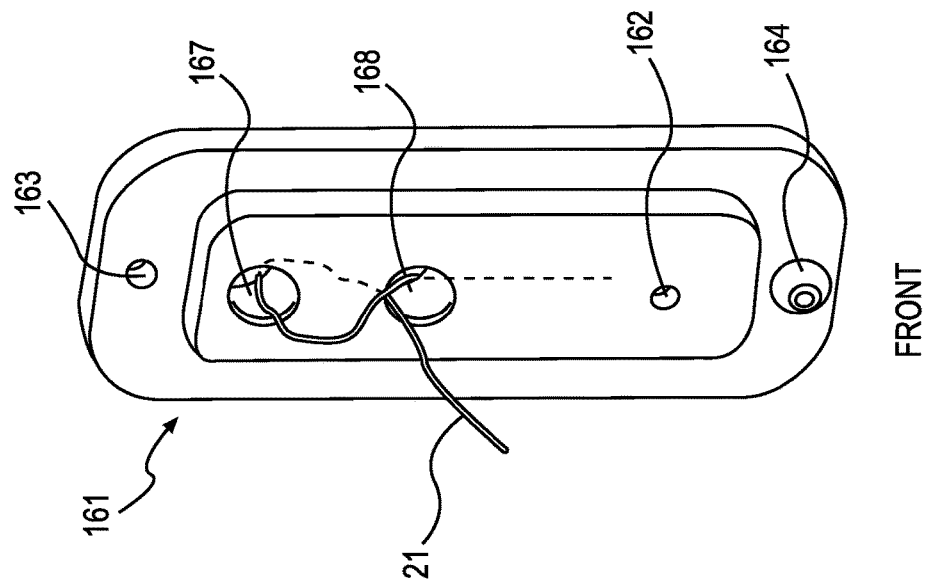
Figure 14B:
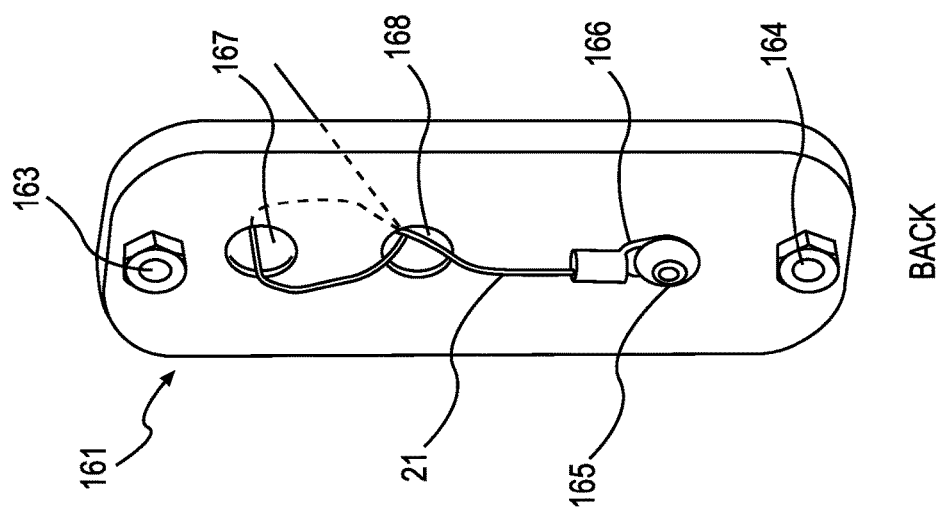

FIGS. 14B and 14C show the front and back faces of the interface plate 161 in more detail, with the front surface being the surface that faces the tether assembly, and the back surface facing toward the bulkhead insert plate 51. The tether interface plate (or "isolation insert") 161 has two holes 163 and 164 for the bolting holes to mount to the bulkhead 120, an attachment point 162 for a screw head 165 and a ring terminal 166, and two through-holes 167 and 168, through which the tether end is looped.

The tether end is looped through both through-holes 167 and 168, and then the termination point of the tether 21 is connected to a ring terminal 166 for electrical connection to the endmass 12. The tether is looped through the through-holes 167 and 168 to minimize any mechanical stress induced during the deployment sequence on the electrical connection.

Note that a few feet on each end of the tether 21 can be coated with an abrasion resistant coating for improved durability and electrical isolation purposes.

FIG. 14A also shows the position of an optional camera 171 mounted on the S endmass 12 bulkhead 120, with the camera facing toward the tether, spool, stacer, and R endmass 11.

FIG. 14A also shows the attachment area for the stacer 31 to the tether spool 22. Recall from the discussion of FIG. 7A that the stacer spring 31 is affixed by riveting the stacer 31 to the center rod 33, and the end of the center rod 33 is threaded into a mating threaded opening in the end of the spool 22.

In a preferred embodiment, all fasteners in the system are formed of 18-8 stainless steel. 6061-T6 aluminum forms the electronics and structural rails, the center module rails, the bulkheads, the end panels, the structural panels, the stacer housing, and the tether spool. Torlon 4203L forms the collector housing and spool, stacer insert, and tether insert.

A 1095 high carbon blued spring steel forms the collectors. A 301 stainless steel forms the stacer spring. The burn wire resistance wire is nichrome. The tensioning line on the stacer and collector release systems is VECTRAN. The tether is a combination of KEVLAR and ARACON brand fiber. The stacer insert is TORLON, and the stacer insert and magnetic coils are epoxied with Uralane 5753LV.

TORLON is a registered trademark of Solvay Plastics, with U.S. offices in Houston, Tex., for a high strength thermoplastic formed of polyamide-imide (PAI). Uralane 5753LV is a polymer commercially available from Specialty Polymers and Services, Inc., headquartered in Valencia, Calif., USA. ARACON is a registered trademark of Micro-Coax, Inc., headquartered in Pottsdam, Pa., USA. KEVLAR is a registered trademark of E.I. du Pont de Nemours and Company, headquartered in Wilmington, Del., USA, for para-aramid synthetic fiber. SPECTRA is a registered trademark of Honeywell International Inc., for a gel-spun synthetic fiber material of thermoset polyethylene, and particularly for ultra high molecular weight polyethylene, also known as high modulus polyethylene or high performance polyethylene, commercially available from Honeywell Advanced Fibers and Composites, Colonial Heights, Va., USA. VECTRAN is a registered trademark of Celanese Corporation, headquartered in Dallas, Tex., USA, for a spun liquid crystal polymer.

The invention has been described with reference to certain preferred embodiments. It will be understood, however, that the invention is not limited to the preferred embodiments discussed above, and that modification and variations are possible within the scope of the appended claims.

The invention claimed is:

1. A tethered spacecraft, comprising:
a first endmass;
a second endmass;
a telescoping spring coiled around a center rod and initially contained within a housing, the spring being biased to push the first endmass away from the second endmass; and
a tether wound on a spool,
the housing being affixed to the first endmass, a first end of the spring being affixed to the spring housing, a first end of the tether being affixed to a second end of the spring, and the tether having a second end affixed to the second endmass.

2. The tethered spacecraft according to claim 1, wherein upon deployment, the telescoping spring is released and extends to form a rigid cylindrical boom, the telescoping spring pushes the endmasses apart, and the tether unwinds from the spool as the endmasses continue to move apart.

3. The tethered spacecraft according to claim 1, wherein the spring housing extends along a centerline of the spacecraft and fits within an interior surface of the spool in a stowed position.

4. The tethered spacecraft according to claim 1, wherein the tether spool is in direct contact with the second end of the spring and in direct contact with the tether, the tether spool providing attachment between the spring and tether.

5. The tethered spacecraft according to claim 4, wherein the tether, the spring, and the tether spool comprise electrically conductive materials, forming a continuous electrical path between the first end mass and the second end mass.

6. The tethered spacecraft according to claim 1, wherein the tether comprises an electrically conductive metal and the telescoping spring comprises an electrically conductive metal, with a conductive connection between the tether and the spring, forming a continuous electrical path from the first endmass to the second endmass.

7. The tethered spacecraft according to claim 1, further comprising:
a pretensioned loop extending between a tensioning system in the first endmass and a burn wire release system in the second endmass, the pretensioned loop configured to hold the first endmass in position abutting the second endmass until the burn wire release system cuts the pretensioned loop.

8. The spacecraft according to claim 7, wherein the tensioning system configured to pretension the loop to hold the first endmass in position abutting the second endmass before release.

9. The spacecraft according to claim 7, wherein the burn wire release system includes at least one burn wire release mechanism, each mechanism having a resistively heated burn wire positioned in contact with the pretensioned loop, wherein in operation, a current flows through the burn wire in either a primary or secondary mechanism, heating the burn wire sufficiently to cut the pretensioned loop material.

10. The spacecraft according to claim 9, wherein each end mass has a bulkhead with an opening therethrough, and wherein the pretensioned loop extends through the openings in each bulkhead, and wherein the burn wire release mechanisms are positioned on the bulkhead of one of the end masses.

11. The spacecraft according to claim 7, wherein the burn wire release system includes at least two burn wire release mechanisms.

12. The spacecraft according to claim 7, wherein the burn wire comprises nichrome and the pretensioned loop material comprises a polymer.

13. The spacecraft according to claim 7, wherein the pretensioned material comprises a spun liquid crystal polymer.

14. The tethered spacecraft according to claim 1, further comprising: a central hollow rod affixed to the second endmass along a centerline of the spacecraft, the telescoping spring being wound around the central hollow rod.

15. The tethered spacecraft according to claim 1, wherein the tether comprises braided plurality of strands of para-aramid synthetic fiber and electrically conductive metalized aromatic polyamide fiber.

* * * * *